US012600379B2

(12) United States Patent
Mück et al.

(10) Patent No.: US 12,600,379 B2
(45) Date of Patent: Apr. 14, 2026

(54) COMPUTER SYSTEM AND METHOD FOR DETERMINING RELIABLE VEHICLE CONTROL INSTRUCTIONS USING TRAFFIC SIGNAL INFORMATION

(71) Applicant: Urban Software Institute GmbH, Chemnitz (DE)

(72) Inventors: Jürgen Mück, Munich (DE); Aristotelis Hadjakos, Detmold (DE); Stefan Radomski, Garching Bei München (DE); Michele Piccolini, Garching Bei München (DE)

(73) Assignee: Urban Software Institute GmbH, Chemnitz (DE)

( * ) Notice: Subject to any disclaimer, the term of this patent is extended or adjusted under 35 U.S.C. 154(b) by 232 days.

(21) Appl. No.: 18/300,765

(22) Filed: Apr. 14, 2023

(65) Prior Publication Data

US 2023/0249713 A1     Aug. 10, 2023

Related U.S. Application Data

(63) Continuation of application No. PCT/EP2021/078157, filed on Oct. 12, 2021.

(30) Foreign Application Priority Data

Oct. 16, 2020     (EP) .................................... 20202248

(51) Int. Cl.
| | |
|---|---|
| *B60W 60/00* | (2020.01) |
| *B60W 40/04* | (2006.01) |
| *G06N 3/04* | (2023.01) |
| *G06N 3/08* | (2023.01) |

(52) U.S. Cl.
CPC ........ *B60W 60/0015* (2020.02); *B60W 40/04* (2013.01); *G06N 3/04* (2013.01); *G06N 3/08* (2013.01); *B60W 2556/45* (2020.02)

(58) Field of Classification Search
CPC ............. B60W 60/0015; B60W 40/04; B60W 2556/45; G06N 3/04; G06N 3/08;
(Continued)

(56) References Cited

U.S. PATENT DOCUMENTS

| | | | | |
|---|---|---|---|---|
| 9,818,297 | B2 * | 11/2017 | El-Tantawy | ........... G08G 1/083 |
| 10,235,882 | B1 | 3/2019 | Aoude et al. | |

(Continued)

FOREIGN PATENT DOCUMENTS

| | | |
|---|---|---|
| EP | 3340204 A1 | 6/2018 |

OTHER PUBLICATIONS

Bieshaar et al., Quantile Surfaces—Generalizing Quantile Regression to Multivariate Targets, Sep. 29, 2020, arXiv: 2010.05898, pp. 1-15.*

(Continued)

*Primary Examiner* — Andrew R Dyer
(74) *Attorney, Agent, or Firm* — Brake Hughes Bellermann LLP

(57) ABSTRACT

Described techniques receive signal state data from a controller controlling one or more signal groups of a traffic light system, with a current signal state of respective signal groups, and information about the time interval elapsed since the last state switch of respective signal groups. A feature vector is generated with a first value indicating the elapsed time since the latest switch of the respective signal group to a pass-state, and a second value indicating the elapsed time since the latest switch of the respective signal group to a stop-state. Based on the current feature vector, a quantile regression neural network predicts a low conditional quantile representing the minimum-end-time, a medium conditional quantile representing the likely-time and a high conditional quantile representing the maximum-end-time for respective signal groups. A message which (Continued)

includes the predicted minimum-end-time, likely-time, and maximum-end-time is provided to a receiving device associated with the vehicle.

17 Claims, 13 Drawing Sheets

(58) Field of Classification Search

CPC ............... G08G 1/07; G08G 1/096725; G08G 1/096783; G08G 1/0141

USPC .......................................................... 701/23

See application file for complete search history.

(56) References Cited

U.S. PATENT DOCUMENTS

| | | | | |
|---|---|---|---|---|
| 2012/0154175 A1* | 6/2012 | Bandou | .................. | G08G 1/164 |
| | | | | 340/905 |
| 2019/0266513 A1* | 8/2019 | Eban | ...................... | G06N 20/00 |
| 2020/0387786 A1* | 12/2020 | Kraus | ...................... | G06N 3/08 |
| 2021/0201058 A1* | 7/2021 | Artamonov | ........... | G06F 18/285 |
| 2021/0276594 A1* | 9/2021 | Oh | ........................... | H04W 4/44 |
| 2023/0206755 A1* | 6/2023 | Jha | ........................... | H04W 4/40 |
| | | | | 340/425.5 |

OTHER PUBLICATIONS

International Search Report and Written Opinion for PCT Application No. PCT/EP2021/078157, mailed on Jan. 27, 2022, 13 pages.
R. Scheepjens "Algorithm Design for Traffic Signal Timings Predictions of Vehicle-Actuated Controlled Intersections Using Support Vector Regression", Nissan Research Center Silicon Valley, May 23, 2016, 137 pages.

* cited by examiner

1000

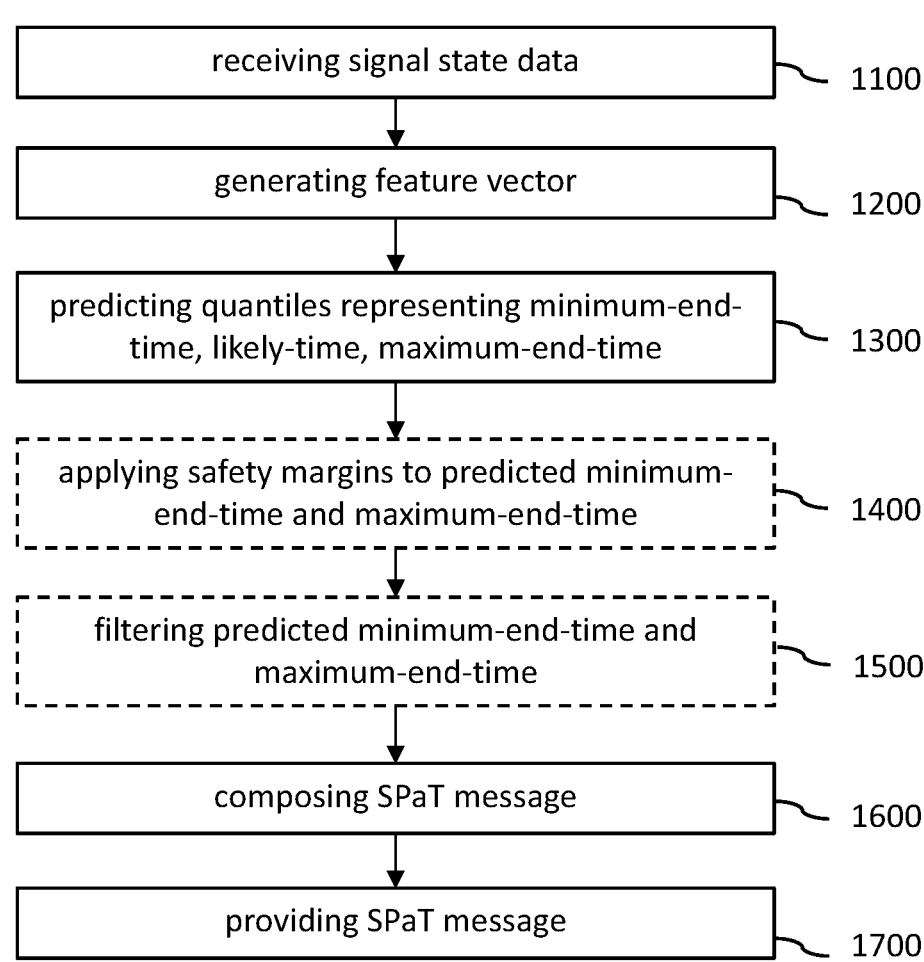

| receiving signal state data | 1100 |

| generating feature vector | 1200 |

| predicting quantiles representing minimum-end-time, likely-time, maximum-end-time | 1300 |

| applying safety margins to predicted minimum-end-time and maximum-end-time | 1400 |

| filtering predicted minimum-end-time and maximum-end-time | 1500 |

| composing SPaT message | 1600 |

| providing SPaT message | 1700 |

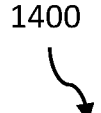

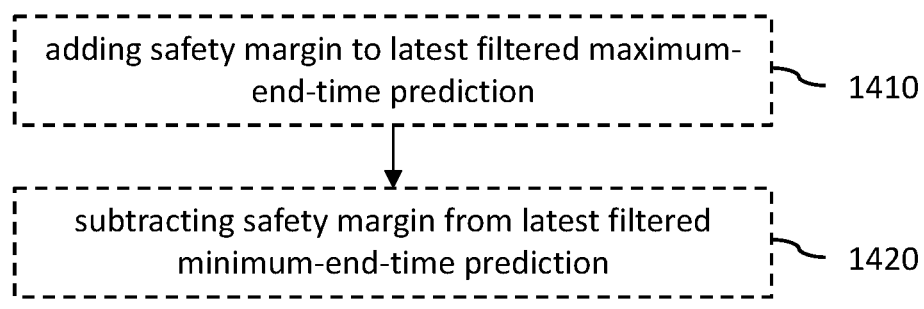

| adding safety margin to latest filtered maximum-end-time prediction | 1410 |

| subtracting safety margin from latest filtered minimum-end-time prediction | 1420 |

FIG. 2B

| SD* | state | Te* |
|-----|-------|-----|
| SD1(t1) | g | t1 - S1:tg3 |
| SD2(t1) | r | t1 – S2:tr3 |
| SD1(t2) | r | t2 - S1:tr3 |
| SD2(t2) | g | t2 – S2:tg4 |

FV1(S1,t2): *<T1p(t2), T1s(t2)>*

FV(t2): *<T1p(t2), T1s(t2) | T2p(t2), T2s(t2) | ... >*

COMPUTER SYSTEM AND METHOD FOR DETERMINING RELIABLE VEHICLE CONTROL INSTRUCTIONS USING TRAFFIC SIGNAL INFORMATION

CROSS-REFERENCE TO RELATED APPLICATIONS

This application claims priority to, and is a continuation of, PCT/EP2021/078157, filed on Oct. 12, 2021, and entitled "Computer System and Method for Determining Reliable Vehicle Control Instructions," which in turn claims priority to EP Appln. No. 20202248.9 filed on Oct. 16, 2020, both of which are incorporated by reference in their entireties.

TECHNICAL FIELD

The present description generally relates to systems for vehicle control, and more particularly, relates to methods, computer program products and systems for traffic light signal switch prediction for vehicle control.

BACKGROUND

Signal Phase and Timing (SPaT) information can be communicated to vehicles in order to enable an improved driving behavior of the vehicle in that unnecessary acceleration or braking activities are avoided to reduce energy consumption of the vehicle and to improve overall traffic safety. Besides the actual signal state, SPaT messages include the earliest point in time (minEndTime) when a signal switch to the next signal state can be expected, the most likely point in time (likelyTime) for this signal switch together with a confidence value (confidence), and the latest point in time (maxEndTime) for the signal's next switching data. Many vehicle control systems (e.g., engine or brake control) use the likelyTime for triggering vehicle control instructions in accordance with the expected future signal changes, while, in many prior art systems, minEndTime and maxEndTime are typically set to default values without meaning. Typically, minEndTime is set to "now" (current time), while maxEndTime is set to "now+3600s".

However, this prediction approach has shown to be less accurate than required for reliable control information to vehicles, in particular when the traffic light system is traffic actuated.

As used herein, the term "traffic light system" refers to the entire electronic equipment used for control and display of all light signals installed at a particular street crossing. The term "traffic light" refers to a single light emitting device which is configured to present light signals belonging to a signal group (e.g., red, yellow, green) for one or more street lanes entering said crossing.

SUMMARY

Hence, there is a need for improving the reliability of SPaT information with regard to the predicted next signal switch of a traffic light (i.e. traffic signal) to allow for use of the information for vehicle control and, thereby, improving traffic safety.

This technical problem is solved by a computer system, a computer-implemented method and a computer program product as disclosed in the independent claims.

In one embodiment, a computer system is provided which provides SPaT messages to a vehicle wherein the SPaT messages include timing parameters to influence the operation of the vehicle. Reliable timing parameters, as used herein, refer to predicted signal switching state data time points which can be predicted with a probability close to 1 (e.g., >0.95). In many prior art systems typically a likely-Time parameter is provided for a potential switching state data time point with a coarse confidence value according to the SPaT related specification SAE J2735. The confidence value TimeIntervalConfidence is thereby coded according to the following mapping.

What is sent via the SPaT message to the vehicle is one of the integer values 0 to 15 indicating the respective range confidence values associated with the integer via the mapping. However, when for example the vehicle receives a likelyTime parameter indicating a potential switch in 7 seconds with a confidence between 68% and 73% the information is not really helpful in that the vehicle cannot derive any specific operating instruction from the information. Therefore, it is advantageous to provide reliable timing parameters to the vehicle which indicate a state change (signal switch) with a probability of close to 1. Not in every situation such reliable timing parameters can be provided. But when they can be provided, the vehicle can use the information to adjust its operation in accordance with the predicted switching state data time points.

As mentioned already in the background section, the maxEndTime and minEndTime parameters predicted by using Hidden Markov Models leave room for improvement with regard to the accuracy of the prediction. The herein disclosed approach significantly improves the reliability of such parameters over the prior art solution when providing SPaT messages for influencing operation of a vehicle with timing parameters for the minimum-end-time, likely-time, and maximum-end-time for the next signal switch of at least one signal group of a traffic light system affecting the vehicle. The minimum-end-time thereby specifies a future time point when the signal switch can occur at the earliest, and the maximum-end-time specifies a future point in time when the signal will switch at the latest. The likely-time specifies the time point with the highest probability for the signal switch. Thereby, a traffic light system affecting the vehicle is a traffic light system which will be reached by the vehicle at a future point in time and which provides pass or stop information to the vehicle with regard to an entry controlled by the traffic light system (e.g., the entry into a crossing).

To solve the above technical problem, computer system, method and computer program product are proposed for providing SPaT messages for influencing operation of a vehicle, wherein the SPaT messages include timing parameters for the minimum-end-time, likely-time, and maximum-end-time of at least one signal group of a traffic light system affecting the vehicle. The proposed system has an interface component to receive signal state data from a controller controlling one or more signal groups of a traffic light system. Thereby, the signal state data of a particular signal group comprises at least a current signal state of the respective signal group and information about the time interval which has elapsed since the last state switch of the respective signal group. Optionally, the interface component may further receive one or more of the following data: state and timing data from the other signal groups, detector data from detectors of the traffic light system (e.g., from induction coil detectors, camera detectors, etc.), parameters of the controller (e.g., minimum length of a green phase) and detector operating states (e.g., state information indicating whether a detector works properly or has a defect) and other operating parameters related to the signal groups of the traffic light system.

In the following, the signal state data and elapsed time information is used as the input data for signal prediction by the computer system. A person skilled in the art can include the optional data as additional information in the respective prediction models to further improve the accuracy of predictions. The signal state data of a particular signal group includes at least a pass-state and a stop-state of the particular signal group at respective sampling time points. However, most real-world traffic light systems also use transitional states (e.g., red light (stop-state) ⬜ red/yellow light (transitional state to prepare for departure) ⬜ green light (pass-state), or green light (pass-state)→yellow light (transitional state to indicate upcoming stop signal)→red light (stop-state)).

The system further has a data pre-processor to generate a feature vector for the one or more signal groups from said input data (i.e., the data received via the interface component). As the interface component continuously receives signal state data and elapsed time information from the controller (typically one or more updates per second), the computer system is aware of the signal state data history of the traffic light system. Based on the actual signal state data and the historic signal state data, the pre-processor computes for each of the one or more signal groups at least a first value indicating the elapsed time since the latest switch of the respective signal group to the pass-state, and a second value indicating the elapsed time since the latest switch of the respective signal group to the stop-state. Thereby, intermediate states are mapped to the corresponding pass- or stop-state.

The computer system further has at least one quantile regression neural network (QRNN). It is to be noted that a skilled person can implement quantile regression neural networks to provide the same predictions as a single neural network when being trained accordingly. The at least one QRNN receives a particular current feature vector as test input, and predicts for at least one of the one or more signal groups, as one or more outputs, a low conditional quantile representing the minimum-end-time, a medium conditional quantile representing the likely-time, and a high conditional quantile representing the maximum-end-time for the at least one of the one or more signal groups. As mentioned before, a single QRNN can be trained to predict all of said quantiles for all of said signal groups. In alternative implementations, separately trained QRNNs may be used to predict all of said quantiles for a particular signal group, or even only one of said quantiles for a particular signal group.

The at least one QRNN has been trained with stochastic gradient descent, on past feature vectors of at least a subset of the one or more signal groups of the traffic light system and the observed signal switching times. In one embodiment, the training may also be based on all signal groups of the traffic light system. Thereby, the system uses a loss function being the sum of individual loss functions over the at least one of the one or more signal groups and the corresponding one or more conditional quantiles. Advantageously, the individual loss functions are hinge loss functions. Other loss functions appropriate for quantile regression may be used by a skilled person instead. In case of a single QRNN, the joint loss function is the sum over all individual loss functions. In case of multiple QRNNs at the level of predicting one quantile per signal group, only an individual loss function is needed for training such a QRNN. Any granularity level in between such extreme cases uses a respective joint loss function. The output of the QRNN(s) may be an estimate of the time left for a respective signal group to switch as 50% quantile (=LikelyTime), as 5% quantile (Q0.05, used for calculating MinEndTime) and as 95% quantile (Q0.95, used for calculating MaxEndTime). The percentages of the MinEndTime and MaxEndTime quantiles may be slightly varied.

The computer system further has a message composer to compose the SPaT message (in accordance with the above-mentioned SAE J2735 standard) by including the predicted minimum-end-time, likely-time, and maximum-end-time of the at least one of the one or more signal groups. Typically, the SPaT message includes said predicted parameters for all signal groups of the traffic light system. However, dependent on the direction from which the vehicle approaches the traffic light system, only a subset of predictions associated with the signal groups affecting said direction may be included in the respective SPaT message. That is, the message composer may compose the SPaT messages in a manner which is specific for the various road directions which are controlled by the traffic light system. Finally, the interface component provides the composed SPaT message to a receiving device associated with the vehicle.

In an autonomous car, it may be provided directly to a respective control unit of the autonomous car (e.g., a respective module of the On-Board Driving Computer). In vehicles equipped with driving support systems, the SPaT message may be provided to the board computer of the vehicle to be displayed on the user interface for the driver of the vehicle. Alternatively, it may be sent to a mobile communication device (e.g., a smartphone) of the driver which is associated with the vehicle (e.g., by Bluetooth coupling or the like). Once the vehicle is in possession of a reliable timing parameters, it can take operating decisions accordingly. For example, it may trigger an acceleration operation to pass the traffic light during the pass-state phase with certainty. The acceleration decision may of course depend on other constraints such as the maximum speed limit or the traffic density. Or it may trigger a breaking action if the predicted pass-state phase does not allow the vehicle to pass the traffic light under safe conditions.

The prediction accuracy for the quantiles is already very good when training the QRNN(s) with the basic feature vectors as described above. However, the prediction accuracy can be even further improved when using additional information in the feature vectors. In an example assuming 32 signal groups and 64 detectors, such additional information may be any of the following data fields:

isGreen: Current state of signal groups, 32 binary entries (0=red, 1=green)

isGreenTFalling & isGreenTRising: Time passed since the signals turned red and green the last time. $2 \times 32 = 64$ entries.

controllerState: Status of controller operation and communication cycledsec: Internal reference counter for seconds within a cycle program: currently active signal program or time-of-day pattern dayofweek: Weekday seconds: seconds since 00:00 hrs tPrev: The time passed in seconds since the previous event sensors: The presence or absence of a detector/sensor change event (binary). 64 entries.

sensorTRising & sensorTFalling: Time passed since the sensor was last inactive/active. 128 entries.

configBefore: The previous state of each signal group, encoded as 32 bit binary value for 32 signal groups configTPrev: The time passed from the previous to the current state for each signal group. 32 entries The presence of a characteristic state, binary 1/0. When a characteristic state occurs for a signal, it is very likely to change within a maximum time horizon of about 30 seconds. Two features per signal, one for red and one for green (total of 2×32=64).

In some embodiments, the feature vector may include up to 422 entries. The skilled person can see that some of the additional information is redundant and can be derived by the pre-processor from the historic signal state data. However, some controllers can provide such information directly to the computer system. In such case, the pre-processor can be operated with lower computational effort.

The QRNN(s) may be implemented using any of the following neural network architectures: a recurrent neural network, a multi-layer perceptron, a convolutional neural network, or any other neural network topology which is suitable to learn quantile regression based on said feature vectors. Thereby, a grid search or a random search of the parameter space can yield the appropriate number of layers of the quantile regression neural network, as well as the number of hidden units per layer.

Alternatively, the prediction function of the QRNN may be split into a first neural network model trained for predicting state switching from the pass-state to the stop-state, and a second neural network model trained for predicting state switching from the stop-state to the pass-state.

In one embodiment, the computer system may further include a filter module to ensure consistency in the predictions over time when approaching a future signal state switch. It is desirable that, the closer the current point in time moves towards the predicted switching time point (likely-Time), the narrower the interval between the minimum-end-time (MinEndTime) and the maximum-end-time (MaxEndTime) should become. In any case, it should be avoided that a predicted minimum-end-time occurs earlier in time than the previously predicted minimum-end-time.

The optional filter module implements two regimes: a near-regime and a far-regime. The near-regime is used if the time interval between the actual point in time and the current predicted likely-time is below a predefined filter time interval. In practice, the predefined filter time interval typically is in the order of 30 to 60 seconds. Under this condition, a current minimum-end-time prediction which predicts an earlier point in time than the previous filtered minimum-end-time prediction is filtered out. At the same time, a current maximum-end-time prediction which predicts a later point in time than the previous filtered maximum-end-time prediction is also filtered out. That is, in the near-regime, the filter is applied to the minimum-end-time and the maximum-end-time.

Under all other conditions, only the current minimum-end-time prediction which predicts an earlier point in time than the previous filtered minimum-end-time prediction is filtered out. That is, when the likely-time is beyond the predefined filter interval (far-regime of the filter), the consistency is not enforced for the predicted maximum-end-time.

Applying the above filter to the predicted quantile outputs results in a very strict consistency regime which, at least when operating under the near-regime, always guarantees that the interval between the minimum-end-time and the maximum-end-time cannot broaden when the timepoint of the state switch comes closer and closer. In other words, when time progresses towards the next state switch, and when the filter operates under the near-regime, typically the corridor between the low and high quantile predictions reduces more and more. However, sometimes such a strict consistency regime may be disadvantageous for the prediction quality.

In one embodiment, safety margins are used to attenuate this effect. In this embodiment, the computer system has a safety margin module which adds a first predetermined safety margin to the current high conditional quantile prediction before applying the filter module, and which subtracts a second predetermined safety margin from the current low conditional quantile prediction before applying the filter module. The first and second safety margins may be of the same size. A margin analyzer module is used to determine the first and second predetermined safety margins based on a comparison between historic predictions and corresponding actual switching time points. Thereby, the safety margins are selected to limit the percentage of violating predictions to a percentage below a given threshold value, wherein violating predictions are predictions where the actual state switch of the corresponding signal group occurred before the predicted minimum-end-time or after the predicted maximum-end-time in a given time interval before the actual switching time point. For example, the given time interval can be in the same order of magnitude as the predefined filter interval.

In one embodiment, a computer implemented method provides SPaT messages for influencing operation of a vehicle, wherein the SPaT messages include timing parameters for the minimum-end-time, likely-time, and maximum-end-time of at least one signal group of a traffic light system affecting the vehicle. The method includes:

receiving signal state data from a controller controlling one or more signal groups of a traffic light system, wherein the signal state data of a particular signal group comprises a current signal state of the respective signal group, and information about the time interval which has elapsed since the last state switch of the respective signal group;

generating a feature vector for the one more signal groups, the feature vector comprising for each of the one or more signal groups at least: a first value indicating the elapsed time since the latest switch of the respective signal group to the pass-state, and a second value indicating the elapsed time since the latest switch of the respective signal group to the stop-state;

predicting, by at least one quantile regression neural network with a particular current feature vector as test input, for at least one of the one or more signal groups, as one or more outputs, a low conditional quantile representing the minimum-end-time, a medium conditional quantile representing the likely-time and a high conditional quantile representing the maximum-end-time for the at least one of the one or more signal groups, wherein the quantile regression neural network has been trained with stochastic gradient descent, on past feature vectors of at least a subset of the one or more signal groups of the traffic light system and respective low, medium and high conditional quantile outputs, using a loss function being the sum of individual loss functions over the at least one of the one or more signal groups, and the corresponding one or more conditional quantiles, wherein the individual loss functions are hinge loss functions;

composing a SPaT message including the predicted mini-
mum-end-time, likely-time, and maximum-end-time of
the at least one of the one or more signal groups; and
providing the SPaT message to a receiving device asso-
ciated with the vehicle.

In one embodiment, the method further includes:

if the time interval between the actual point in time and
the current predicted likely-time is below a predefined
filter time interval filtering out a current maximum-end-time prediction
which predicts a later point in time than the previous
filtered maximum-end-time prediction, filtering out a current minimum-end-time prediction
which predicts an earlier point in time than the previous
filtered minimum-end-time prediction, and else, only filtering out the current minimum-end-time predic-
tion which predicts an earlier point in time than the
previous filtered minimum-end-time prediction.

The method may further include, before applying filter-
ing, adding a first predetermined safety margin to the current
high conditional quantile prediction, and subtracting a second predetermined safety margin from
the current low conditional quantile prediction, wherein the first and second predetermined safety margins
are determined based on a comparison between historic
predictions and corresponding actual switching time
points and are selected to limit the percentage of
violating predictions to a percentage below a given
threshold value, wherein violating predictions are pre-
dictions where the actual state switch of the corre-
sponding signal group occurred before the predicted
minimum-end-time or after the predicted maximum-
end-time in a given time interval before the actual
switching time point.

In most cases, a green light signal represents the pass-state
and a red light signal represents the stop-state. Some traffic
lights can switch into further states. For example, some
traffic lights include yellow light signals which represent an
intermediate state between the pass and stop-states. The
intermediate states often have the function to alert the driver
of a car that a signal change is coming (either from stop to
pass or from pass to stop). The disclosed system can work
with any number of intermediate states as long as a sequence
of intermediate states is followed by either a pass- or a
stop-state at some point in time. It is to be noted that
intermediate states can always be assigned to a respective
pass- or stop-state phase because also for each intermediate
state entry is either allowed or forbidden. The signal state
data can be transmitted via a network which communica-
tively couples the computer system with the controller of the
traffic light system.

The at least one QRNN performs a sequence of predic-
tions for a sequence of prediction intervals. The term "pre-
diction interval" as used herein describes a time interval
typically of the same length as the length of a sampling
interval wherein the prediction interval is in the future with
regards to the current sampling interval during which the
signal state data was received. Often, the sampling intervals
and the prediction intervals have a duration of one second.
However, other intervals may be chosen instead, such as for
example intervals of a duration of less than a second (e.g.,
multiple updates pers second). The length of the intervals
should be adjusted to the length of a signal state data cycle
of the signal group(s) so that a meaningful prediction becomes possible. A person skilled in the art is able to define
a meaningful length for the sampling/prediction intervals in
the respective situation.

In general, the maximum-end-time predicts the latest
point in time where a current signal state of a particular
signal group switches to a different state. For example, the
signal group may switch from its current state (e.g., pass-
state) into the different state (e.g., stop-state) with a prob-
ability associated with the high quantile prediction. The
determined maximum-end-time therefore provides informa-
tion about when the current state will end at the latest with
a high reliability. For example, when a car is approaching a
green traffic light and has 6 seconds left to pass the traffic
light, and when the car receives a SPaT message with a
maximum-end-time of 4 seconds, the car can initiate a
breaking action because it would not be possible to pass the
traffic light during the pass-state phase.

For example, when a car is approaching a green traffic
light that can be interrupted by a pedestrian demand, a
maximum-end-time may only be transmitted to the car when
the pedestrian signal will become green within a predefined
future time interval If the car would receive a maximum-
end-time without a pedestrian demand the car's assistance
systems may for example activate a breaking maneuver
without need, irritating the driver and reducing trust into the
system's functionality. That is, a maximum-end-time is only
transmitted in such situations where the system can predict
a signal switch within the predefined future time interval. In
other words, the predicted maximum-end-time may only be
provided with the message to a corresponding receiving
device if a future signal switch occurs almost certainly in the
near future. Thereby, a future signal switch occurs almost
certainly when the time interval between the current point in
time and the predicted maximum-end-time falls below a
predefined minimum value. For example, such time interval
may be in the order of 1 to 3 minutes.

The QRNN can learn this behavior based on the historic
signal state data (including the actual switching time points)
describing the actual configuration of the various signal
groups. Thereby, the ground truth corresponds to the
observed time interval depicting the time period until a
signal state actually occurred in the historic data. This allows
to train the QRNN by using Hinge-Loss for computing
conditional quantiles. Such conditional quantiles are esti-
mates for the time intervals until respective state switches
occur. Some signals, such as demand signals where pedes-
trians can request a green light for their pedestrian signal
group, may not switch in each control cycle of the controller
but rather show an irregular switching behavior. Some
signals may not switch for hours. For example, at night a
signal may not be used for traffic control any more (because
of low traffic) but may simply be operated for hours in a
"blink yellow" state to indicate that drivers need to be
careful when approaching the respective signal group.

For the herein disclosed prediction approach, in the con-
text of traffic flow control via traffic light systems, predic-
tions are particularly interesting when a state switch is
predicted for a relatively near future time point, for example,
within the next 60 to 180 seconds (time interval for potential
signal switch). Therefore, when training the QRNN, the
ground truth can be cut off at a predefined value during this
interval. Advantageous cut-off values are in the range 90 to
120 seconds. In other words, during the training of the
QRNN, ground truth values greater than a predefined cut-off
value are replaced with the predefined cut-off value. As a
consequence, such a trained QRNN assumes that, for a
prediction provided by the QRNN at a particular point in time with maximum-end-time, likely-time and minimum-end-time prediction values close to the cut-off value, a signal switch is not expected in the near future. However, if the maximum-end-time prediction falls significantly below the cut-off-value, the QRNN has learned that the signal will switch soon.

In other words, the QRNN has learned to distinguish between two value regions wherein, in a first value region, maximum-end-time is close to the predefined cut-off value. Ideally, in the first value region the maximum-end-time is slightly greater than the cut-off value. The first value region indicates that no signal switch is expected in the near future. In a second value region, the maximum-end-time (and therefore also the likely-time and the minimum-end-time) are smaller than the cut-off value. This indicates that a signal switch is expected during the time interval as defined by the predicted maximum-, likely-, and minimum-end-times.

Alternatively, the conditions for the first and second value regions could be learned with a neural network as a classification problem.

Alternatively, the system can evaluate demand signals (e.g. pedestrian demand signals or signals from induction coil detectors) received from the controller to check if a particular detector requests a switch instruction. If such an instruction is received it indicates a switch of a respective signal group in the near future.

In one embodiment, the system prevents that the predicted maximum-end-time is moved to later time points as time evolves. In other words, at least in situations where the prediction time point comes sufficiently close to the predicted likely time point, the maximum-end-time predicted at a subsequent prediction time point cannot be later than the maximum-end-time predicted at a preceding prediction time point.

The disclosed computer system can load a computer program with executable instructions into a memory of the computer system and execute the computer program with at least one processor of the system so that the above disclosed functions are performed by the computer system to predict signal states of a traffic light system as described herein. When the computer system executes the computer program, the herein disclosed computer-implemented method for providing SPaT messages with reliable timing parameters to influence the operation of the vehicle is executed.

Further aspects of the description will be realized and attained by means of the elements and combinations particularly depicted in the appended claims. It is to be understood that both, the foregoing general description and the following detailed description are exemplary and explanatory only and are not restrictive.

BRIEF DESCRIPTION OF THE DRAWINGS

FIGS. 2A, 2B, 2C are simplified flowcharts of a computer-implemented method according to an embodiment which can be performed by embodiments of the computer system;

DETAILED DESCRIPTION

Figure 1:
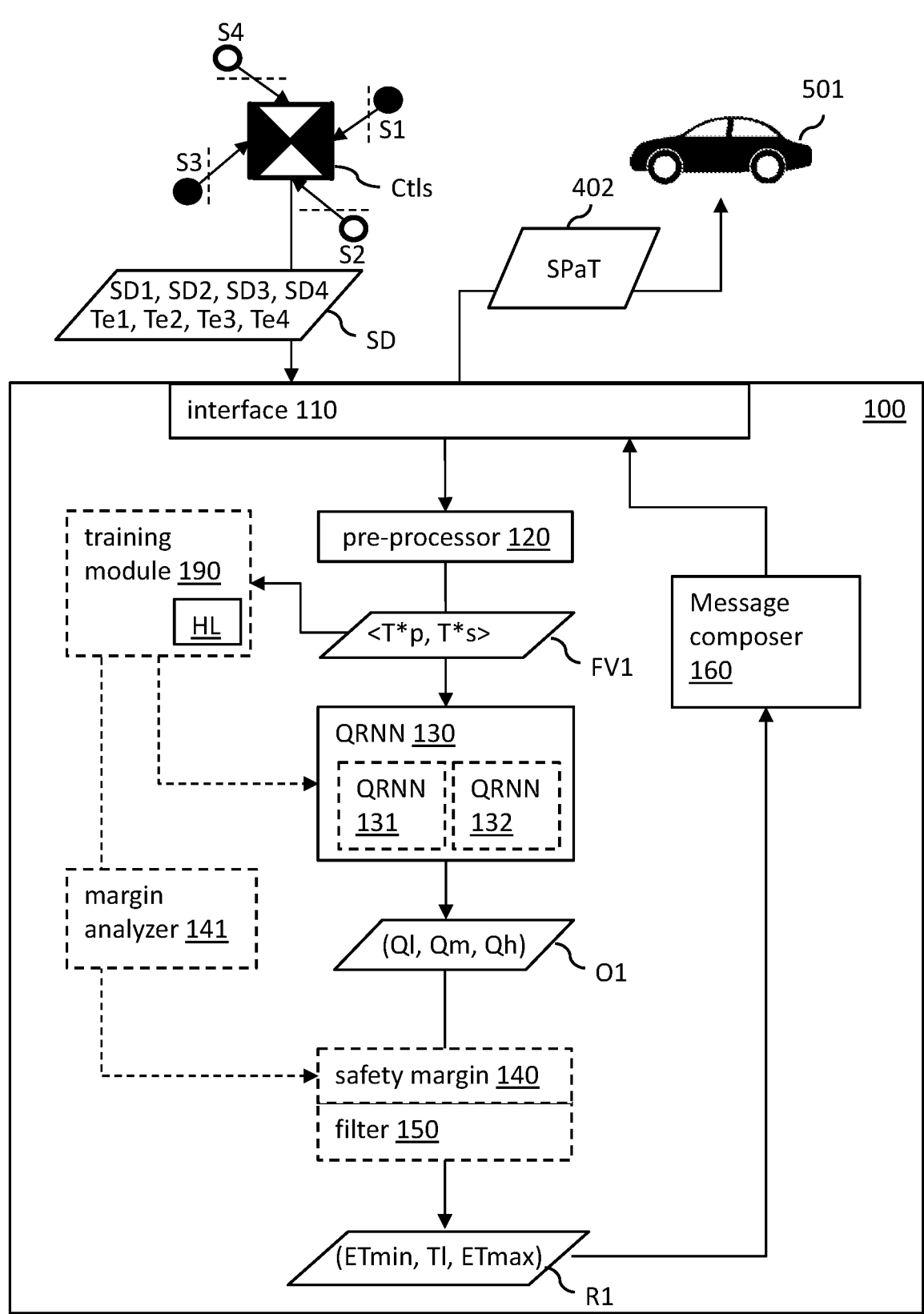
FIG. 1 shows a simplified diagram of an embodiment of a computer system for providing SPaT messages including timing parameters for influencing the operation of a vehicle.
Figure 2C:
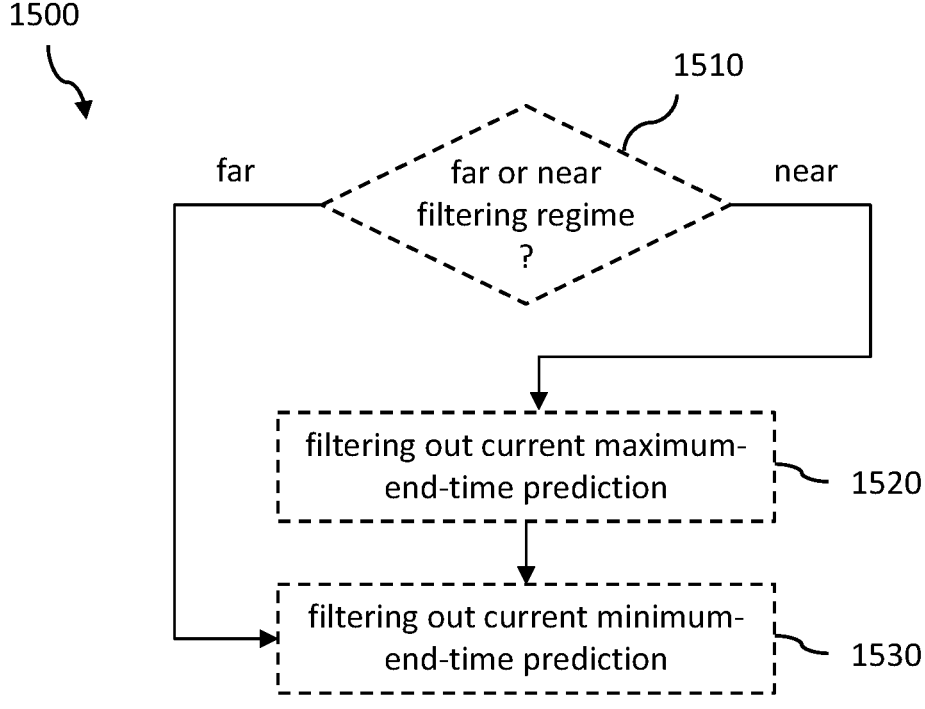

FIG. 1 shows a simplified diagram of an embodiment of a computer system 100 for providing SPaT messages 402 for influencing the operation of a vehicle 501 via interface 110 wherein the SPaT messages include timing parameters to influence the operation of the vehicle. FIG. 1 is described in the context of FIG. 2 which is a simplified flowchart of a computer-implemented method 1000 which can be performed by embodiments of the computer system 100. Therefore, the following description of FIG. 1 in the context of FIG. 2 refers to reference numbers of both figures.

The computer system 100 is communicatively coupled with a controller Ctls controlling one or more signal groups S1 to S4 of a traffic light system. Signal groups are sometimes also referred to as traffic lights. Each signal group S* ("*" being a placeholder for any of the indices 1 to 4) has a dedicated signal state at each given point in time. A signal group light can switch at least between a pass-state and a stop-state. Intermediate states may exist. The driving directions in the example are in the horizontal and the vertical directions. Any sequence of intermediate states is followed at some point in time by either the stop-state or the pass-state. In the example, the current state of S1 and S3 is the stop-state (illustrated by black bullets of the respective traffic lights S1, S3) and the current state of S2 and S4 is the pass-state (illustrated by white circles of the respective traffic lights S2, S4). The square Ctls represents the combined state of all four signal groups with four sub-states corresponding to the signal states of the respective signal groups. The sub-states are illustrated via the triangles: black triangles correspond to the stop-state and white triangles correspond to the pass-state.

In general, the combined (or aggregated state) of at least a subset n of the one or more signal groups results in $2^n$ possible states, but typically in reality only a few states (typically less than 50) are really used. In the example the number of possible states for the four traffic lights S1 to S4 is $2^4=16$. However, in the following example only three combined states are actually used for the prediction of future states. The used states are referred to as: the first combined state where the signal groups S1, S3 are in stop-state and the signal groups S2, S4 are in pass-state (vertical pass); the second combined state where the signal groups S1, S3 are in stop-state and the signal groups S2, S4 are in stop-state (all stop); and the third combined state where the signal groups S1, S3 are in pass-state and the S2, S4 are in stop-state (horizontal pass).

The combined state is sampled at predefined sampling intervals. Typically, a sampling interval has a length (duration) of one second although it can be chosen longer or shorter dependent on the switching cycle of the signal groups. The combined state of including the signal state data SD* is received from the controller Ctls controlling one or more signal groups (S1 to S4) is received 1100 at the sampling frequency by the computer system 100 via interface 110. Alternatively, the signal controller may send a new signal state driven by respective events (event driven push messages). Further, information about the time interval Te* which has elapsed since the last state switch of the respective signal group S* may be received together with the signal state data SD* or may be computed by the pre-processor (e.g., when computing the feature vector). It is to be noted that the number of four signal groups in the example is completely arbitrary. Any number of traffic lights can be used and their respective signal states can be included in the combined state as sub-states. Any appropriate communication technology, such as for example, wireless networks, local area networks or wide area networks may be used to establish the communicative coupling between the computer system and the traffic lights.

For simplicity of explanation, in the example, the simplified assumption is made that signal groups only switch between pass-state and a stop-state. The received state data SD1 is identified as the current signal state of the traffic lights to be analyzed. That is, the computer system is aware of the signal states of each of traffic lights which are represented by a sub-state in the combined state SD1.

A data pre-processor 120 of system 100 generates 1200 a feature vector FV1 for the one or more signal groups S1 to S4. The feature vector FV1 includes for each of the one or more signal groups at least: a first value indicating the elapsed time T*p since the latest switch of the respective signal group S* to the pass-state, and a second value indicating the elapsed time T*s since the latest switch of the respective signal group S* to the stop-state. For example, the system 100 may buffer the received signal data and information about elapsed times received at earlier sampling time points and can then derive the first and second values from the buffered data. Alternatively, the system may implement a pass counter and a stop counter for each signal group. The pass-counter may be reset when the signal group switches to the pass-state thus counting the sampling intervals which elapsed since the latest switch to the pass-state. The stop-counter may be reset when the signal group switches to the stop-state thus counting the sampling intervals which elapsed since the latest switch to the stop-state. The respective elapsed time intervals are then derived by simply multiplying the counter values with the length of the sample interval.

Figures 3A, 3B, 3C:
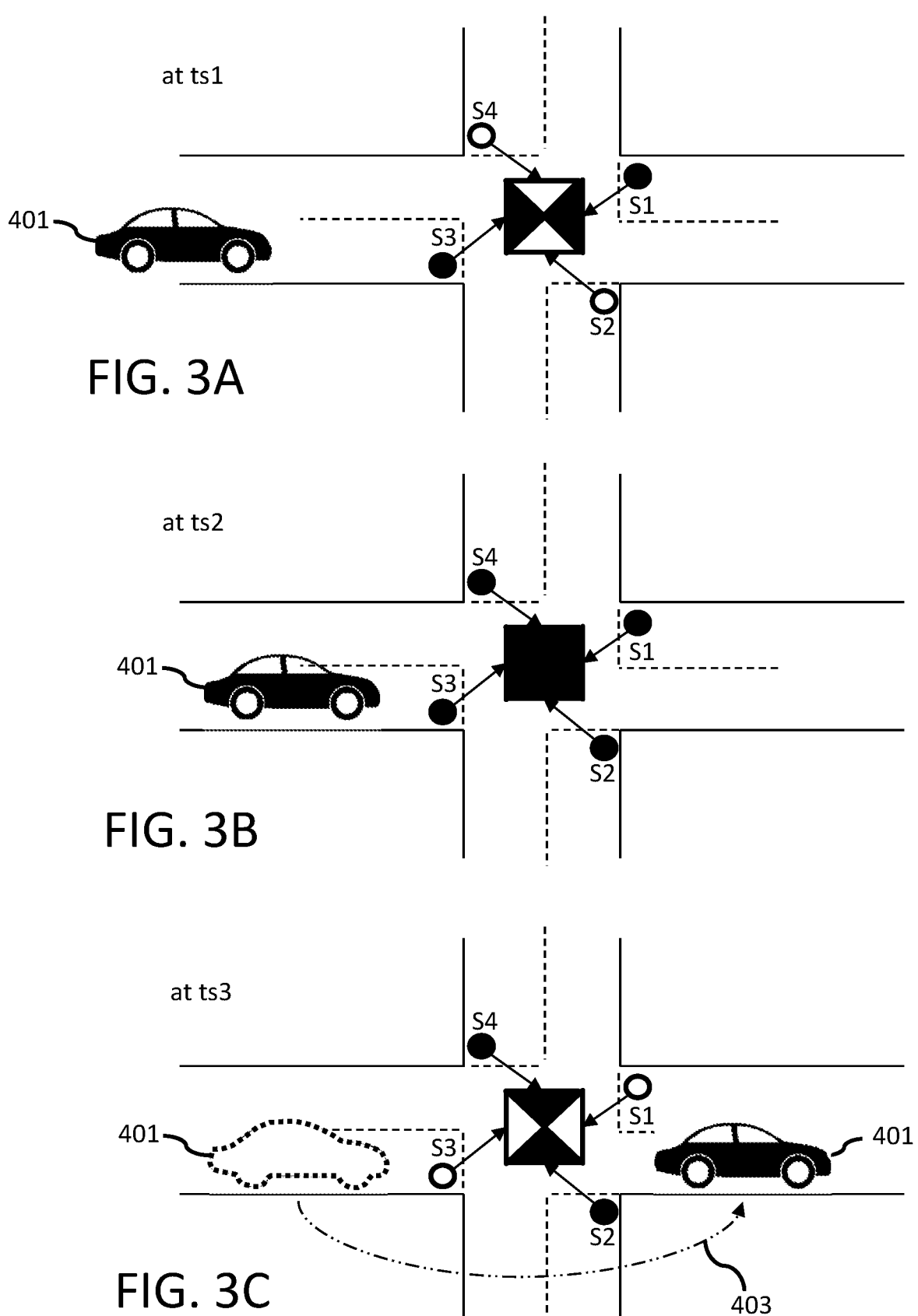
FIGS. 3A to 3C illustrate the state of an example traffic light system at three different sampling time points.
Figure 4:
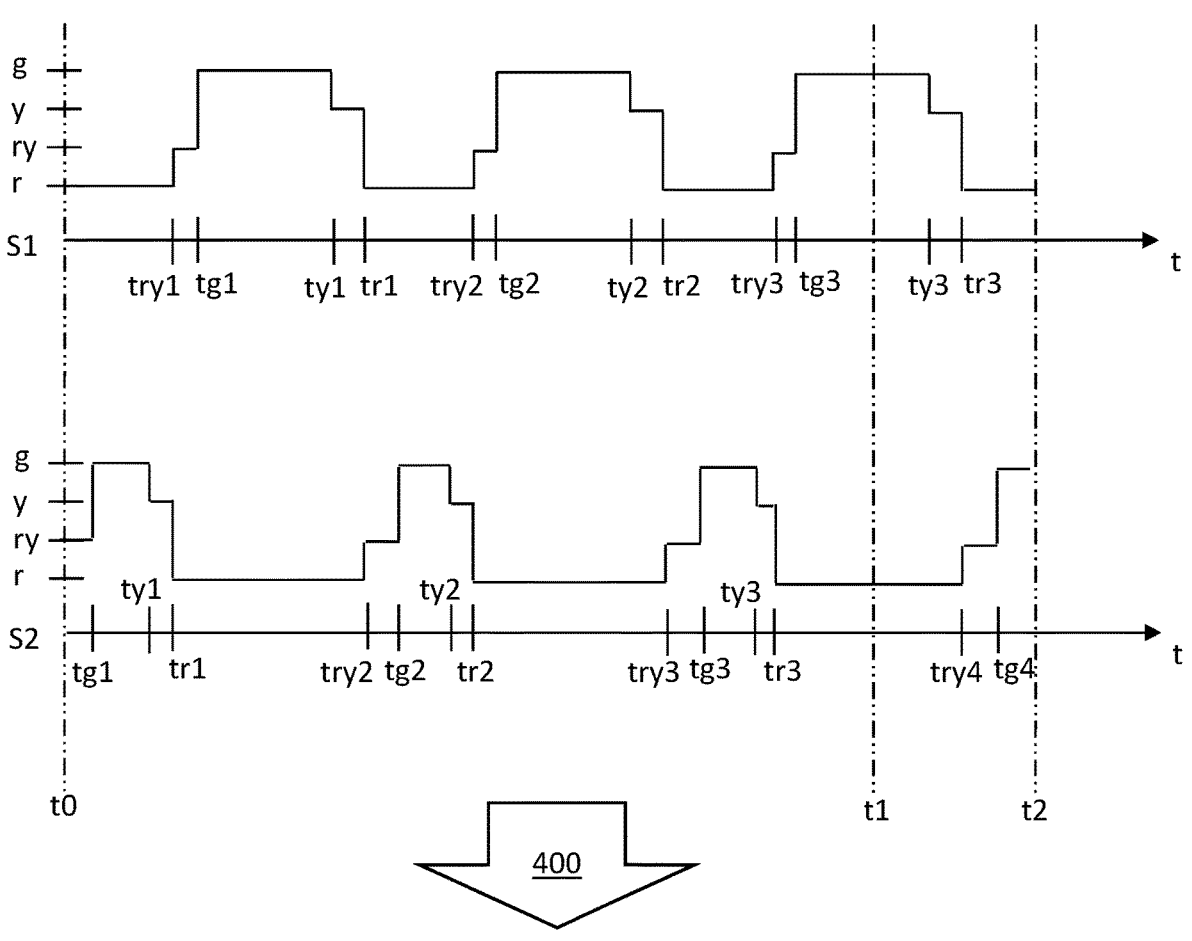
FIGS. 4 and 5 illustrate feature vector generation from received signal state data according to an embodiment.
Figure 5:
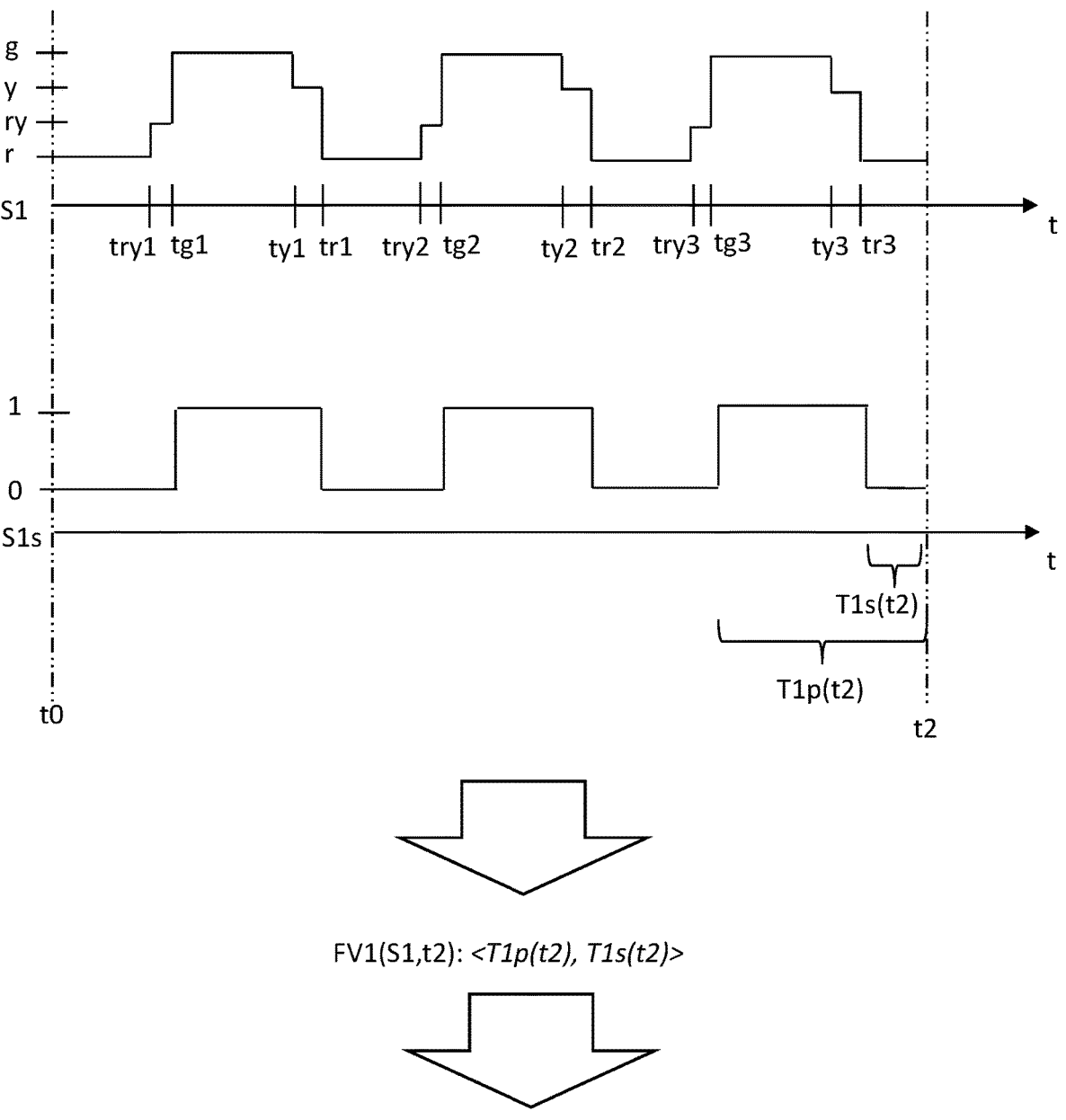

Details of the feature vector generation are now explained in the context of FIGS. 4 and 5. FIG. 4 illustrates in the upper portion (above arrow 400), the time series of signal state data of signal group S1 (upper time series) and signal group S2 (lower time series). It is assumed that the traffic light system uses four different signal states red r, red-yellow ry, yellow y and green g. The switching cycle of each signal group is r◻ ry◻ g◻ y◻ r. The switching time points for S1 are S1:try1 to S1:tr3. The switching time points for S2 are S2:tgy to S2:tg4. In the example, S1 has longer green phases than S2. For example, at t0, S1 in in state r and switches to ry at S1:try1. Then, it switches to g at S1:tg1 before switching to y at S1:ty1 and finally back to r at S1:tr1. Until the current time point t2 this switching cycle is repeated three times with the corresponding switching times having the indices 2 and 3 for the second and third switching cycles, respectively. For S2, complementary switching cycles are shown. In real-world switching behavior of a traffic light system, typically the stop-states of S1 and S2 show overlapping time intervals as illustrated in example as described with FIGS. 3A to 3C.

The lower part of FIG. 4 illustrates signal state data SD* for the signal groups S1 and S2 received from the controller based on the illustrated switching behavior of the traffic light system at the time points t1 and t2 (with t2 being the current point in time).

At t1, S1 is in state g and the elapsed time Te1($t1$) since the last signal switch is t1-S1:tg3. At the same time, S2 is in state r and the elapsed time Te2(T1) since the last signal switch is t1-S2:tr3. At t2, S1 is in state r and the elapsed time Te1($t2$) since the last signal switch is t2-S1:tr3. At the same time S2 is in state g and the elapsed time Te2($t2$) since the last signal switch is t2-S2:tg4.

FIG. 5 illustrates the pre-processing performed by pre-processor 120 to finally arrive at the current feature vector FV1 for signal group S1 (by example) and finally the current feature vector FV for the entire traffic light system at the current time point t2. In the example, the preprocessor reduced the received signal state data of S1 to a simplified representation S1$s$ which only includes state switches between pass and stop-states. In the example, the ry state is considered as part of the stop-state 0 because a vehicle is not yet allowed to enter during this phase. On the other hand, the y state indicates to the vehicle that the r state is to be expected soon. However, passing is still possible. Therefore, the y state is considered as part of the pass state 1 in the example. It is to be noted that the number of signal states of a signal group and the corresponding switching cycle can vary for different traffic light systems. Typically, different countries use different setups according to their respective rules. However, it is always possible to map any intermediate state to either a pass-state 1 or a stop-state 0.

From the signal state data SD1 received at earlier points in time, the preprocessor can now derive for the current point in time t2 the time interval T1$s$(t2) which has elapsed since the last switch to the stop-state 0. Similarly, it derives the timer interval T1$p$(t2) which has elapsed since the last switch to the pass-state 1. That is, the feature vector FV1(S1, t2) is <T1$p$(t2), T1$s$(t2)>. It is to be noted that there is no need to include the signal state itself in the feature vector because it is implicitly encoded in said time intervals. As T1$s$(t2)<T1$p$(t2), it is clear that the current simplified signal state can only be the stop-state 0. Finally, the feature vector FV at t2 for the entire traffic light system includes the feature vectors of each signal group, respectively: FV(t2):<T1$p$(t2), T1$s$(t2)|T2$p$(t2), T2$s$(t2)| . . . >

Embodiments receiving additional information from the controller Ctls may achieve an even improved accuracy for the timing parameters in the SPaT message. For example, in addition to T*s (isGreenTFalling) and T*p (isGreenTRising), any one of the above described optional parameters may be added to the feature vector FV1: isGreen, current state of at least a subset of the one or more signal groups, controllerState, cycledsec, program, dayofweek, seconds, tPrev, sensors, sensorTRising & sensorTFalling (the detector equivalents to T*p and T*s), configBefore, configTPrev, presence of characteristic state.

Turning back to FIG. 1, at least one quantile regression neural network 130 of the system 100 receives a particular current feature vector <T*p, T*s> (plus any of the above optional parameters as additional vector components) as test input from the pre-processor 120. The at least one quantile regression neural network 130 has been trained with stochastic gradient descent on past feature vectors of at least a subset of the one or more signal groups of the traffic light system and respective low, medium and high conditional quantiles. The training of QRNN 130 may be performed by a training module 190 which may be an integral part of the computer system 100. However, the training module 190 may also be implemented as part of a separate system or even as a stand-alone tool.

The trained QRNN 130 is able to predict 1300, for at least one of the one or more signal groups S1 to S4, as one or more outputs O1, a low conditional quantile Ql representing the minimum-end-time (ETmin), a medium conditional quantile Qm representing the likely-time (Tl) and a high conditional quantile Qh representing the maximum-end-time (ETmax) for the at least one of the one or more signal groups S1 to S4. Thereby, QRNN 130 is trained based on the historic switching time points with the Hinge-Loss so that the QRNN learns to predict the conditional quantiles. For the training of QRNN 130, a loss function is used which is the sum of individual loss functions over the at least one of the one or more signal groups S1 to S4, and the corresponding one or more conditional quantiles. Thereby, the individual loss functions are hinge loss functions HL.

In an advantageous embodiment good results for the predicted were achieved when training QRNN 130 with the following hinge loss:

$$L_\gamma(y^t, y^p) = \sum_{i=y_i^t < y_i^p} (\gamma - 1)|y_i^t - y_i^p| + \sum_{i=y_i^t \geq y_i^p} \gamma|y_i^t - y_i^p|$$

with $\gamma$ using a value of the corresponding quantile (e.g., 0.05 for the 5% quantile and 0.95 for the 95% quantile. The target values $y_i^t$ correspond to the actual measured switching times of the signal in question. The prediction values $y_i^p$ represent the predictions for a given quantile $\gamma$. The values $y_i^t$ and $y_i^p$ are expressed in seconds until the signal switches.

Figure 6:
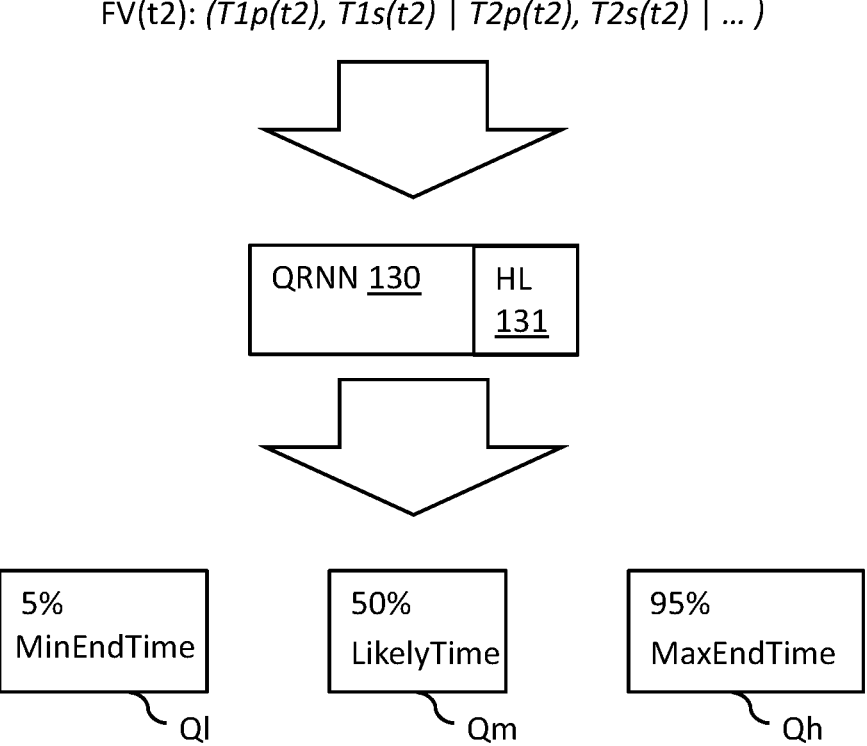
FIG. 6 illustrates quantile prediction using a quantile regression neural network according to an embodiment.

FIG. 6 illustrates an embodiment where multi-objective learning has been performed by training QRNN 130 on at least a subset of the one or more signal groups of the traffic light system with respective feature vectors FV and all three relevant quantile outputs Ql, Qm, Qh (e.g., 5% for MinEndTime, 50% for LikelyTime, 95% for MaxEndTime) jointly. The joint loss function 131 (HL) is then the sum of the loss function over the individual light signals and over the three quantiles in question. Two advantageous neural network architectures for implementing QRNN 130 are a Multi-Layer Perceptron (MLP) architecture and a Recurrent Neural Network (RNN) architecture. However, a skilled person may instead use other architectures, such as for example, convolutional neural networks.

As mentioned earlier, the QRNN implementations were trained with stochastic gradient descent. A grid search (or random search) of the parameter space was performed to estimate the appropriate number of layers and the number of hidden units (nodes) per layer.

Turning back to FIG. 1, it can be advantageous to implement the QRNN 130 with different neural network models 131, 132 which are dedicated to predict state switching from the pass-state to the stop-state and state switching from the stop-state to the pass-state. In other words, two separate neural network models may be trained for predicting the switching from green to red and from red to green. In the scenario, where the QRNN 130 is trained with a combined loss function to make predictions for at least a subset of the signal groups and all output quantiles, a single first neural network model 131 may be trained to predict state switching from the pass-state to the stop-state, and a second neural network model 132 may be trained to predict state switching from the stop-state to the pass-state. In embodiments where more granular QRNNs are used (e.g., prediction per signal group or even per output quantile), for each QRNN corresponding first and second neural network models may be implemented.

The determined quantile outputs Ql, Qm, Oh are provided to a message composer component 160 to compose 1600 the SPaT message 402 accordingly. The composed SPaT message 402 is finally provided 1700 to a communication device associated with the vehicle 501 via interface 110. For this purpose, interface 110 supports a communication protocol which allows to send SPaT messages to such communication devices according to the above-mentioned SPaT specification standard. It is to be noted that interface 110, as used herein, comprises various specific interfaces which may be operated according to different communication protocols. For example, in a real-world implementation, the specific interface for receiving signal data is different from the specific interface used for SPaT message exchange. The message may be directly sent to a control unit of the vehicle, or it may be sent to any driving assistance system supporting the driver of the vehicle to safely navigate the vehicle 501 when approaching the traffic light system.

Once the SpaT message 402 with the minimum-end-time is received by the vehicle 501, the receive information provides all the advantages as described in the summary above with regards to the operation of the vehicle. For example, based on the received minimum and maximum-end-times, the vehicle may take decisions about automatically breaking or accelerating in the context of the current traffic situation. This can be advantageous in an autonomous driving mode of the vehicle.

In one embodiment, the computer system 100 further includes, as an optional feature, a filter module 150 which can perform additional optional filtering step 1500 on the predicted minimum-end-time and max-end-time values further improving the accuracy of the QRNN predictions. Optional features/steps are illustrated by dashed frames in FIGS. 1 and 2. The filter module 150 can select 1510 a far-regime and a near-regime explained in detail in the example of FIG. 7 and FIG. 2C.

In general, if the time interval between the actual point in time and the current predicted likely-time is below a predefined filter time interval (near-regime), the filter module 150 filters out 1530 a current minimum-end-time prediction which predicts an earlier point in time than the previous filtered minimum-end-time prediction, and further filters out 1520 a current maximum-end-time prediction which predicts a later point in time than the previous filtered maximum-end-time prediction. In all other situations (far-regime), the filter 150 is only applied to predicted minimum-end-time values. In other words, the far-regime only filters out 1530 current minimum-end-time predictions which predict earlier points in time than the corresponding previous filtered minimum-end-time predictions.

Figure 7:
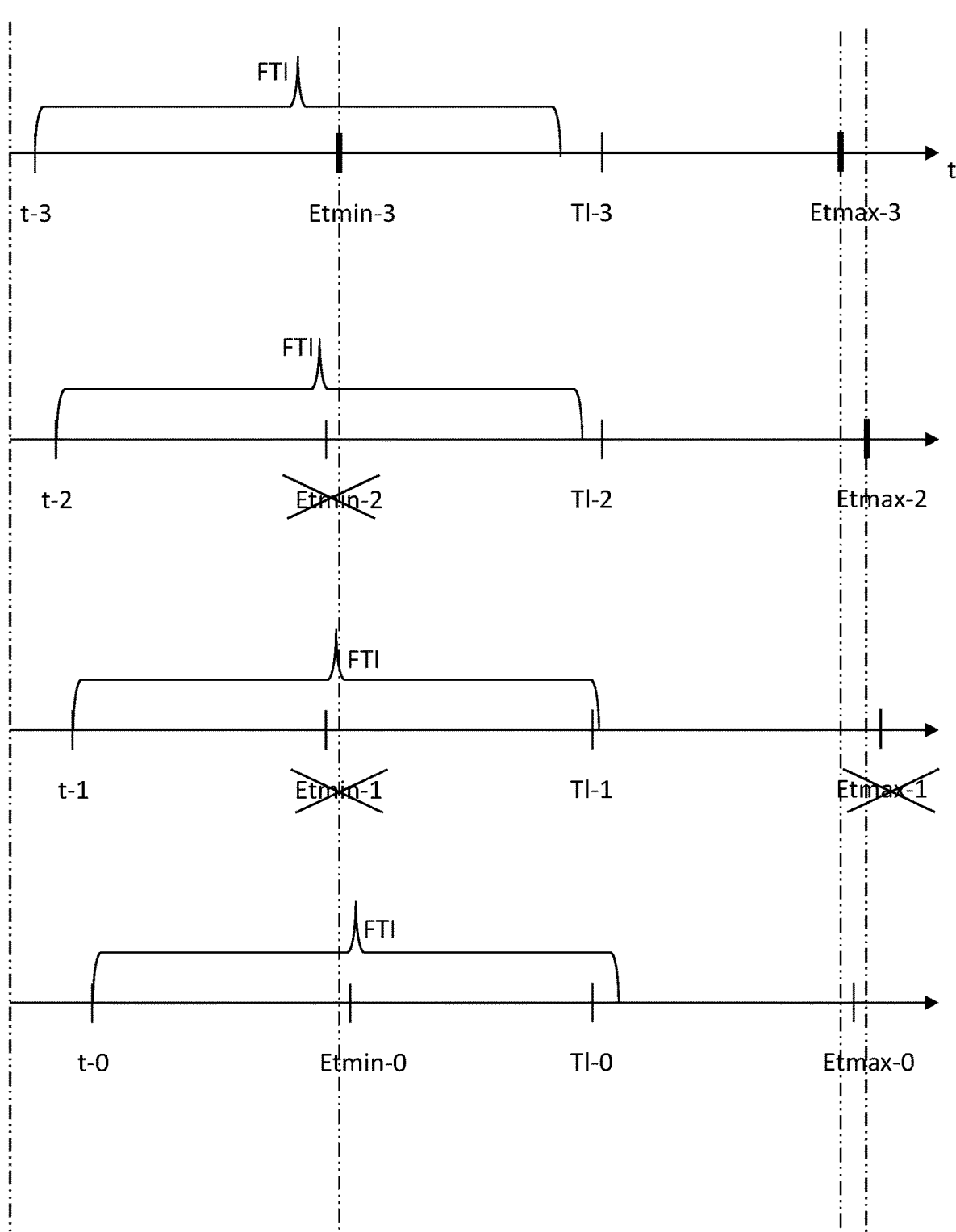
FIG. 7 illustrated an example of a filter function with a near-regime and a far-regime according to an embodiment.

FIG. 7 illustrates the filter operation at the current point in time t–0 and the preceding sampling time points t–1 and t–2. In general, predictions using the filter operation may have been performed already before those example sampling time points. That is, also the prediction at t–3 may already be a filtered prediction result. At t–3, the QRNN predicted a minimum-end-time time Etmin-3, a likely-time Tl-3 and a maximum-end-time Etmax-3. A predefined filter time interval FTI starting at the (at this time) current time point t–3 and extending into the future. Typically, the length of the filter time interval FTI is chosen in the range between 30 sec and 60 sec. However, dependent on the switching behavior of the respective traffic light system, other ranges may be appropriate.

The near-regime of the filter is applied if the length of the time interval between the actual point in time t–3 and the current predicted likely-time Tl-3 is below the length of FTI. At t–3, the predicted likely-time Tl-3 is after the end of the filter time interval FTI and, therefore, the far-regime applies where only maximum-end-time values are filtered out. However, in FIG. 7 it is assumed that ETmax-3 is not at a later point in time than the previously filtered predicted maximum-end-time. Therefore, at t–3, the filtered minimum-end-time is Etmin-3 and the filtered maximum-end-time is Etmax-3.

At t–2 (the sampling time point subsequent to t–3), the QRNN predicts the quantile values (Etmin-2, Tl-2, Etmax-2). Tl-2 is still beyond the filter time interval FTI. Therefore, the far-regime applies. As Etmin-2 is predicted for an earlier point in time that Etmin-3 it is filtered out and the previously predicted Etmin-3 value is kept. Because in the far-regime the filter is only applied to the minimum-end-times, the predicted maximum-end-time Etmax-2 is not filtered out although it is predicted for a later point in time than Etmax-3 at the previous sampling time point.

At t–1, the predicted likely-time Tl-1 falls into the filter time interval FTI. Therefore, now the near-regime of filter 150 is applied. The predicted minimum-end-time Etmin-1 is at an earlier time point than the still valid filtered prediction Etmin-3 and is therefore filtered out. The predicted maximum-end-time Etmax-1 is later than the currently valid filtered prediction Etmax-2 and is therefore filtered out.

At t–0 (the current point in time), again the predicted likely-time Tl-0 is within FTI. Thus, the near-regime is applied. However, no filtering takes place because the predicted minimum-end-time Etmin-0 is later than the latest valid filtered Etmin-3 and the predicted maximum-end-time Etmax-0 is earlier than the latest valid filtered maximum-end-time Etmax-2. Thus, Etmin-0 and Etmax-0 now replace the currently valid corresponding filtered values leading to a narrowing of the predicted time window for the next signal state change.

Turning back to FIG. 1 and FIG. 2C, the filtering by filter 150 may become too strict and lead to too narrow time intervals for the predicted time window [minimum-end-time, maximum-end-time] in certain situations. Therefore, it has turned out that it can be advantageous to reduce the impact of the filter function for certain traffic light system switching behaviors. This can be achieved by using a safety margin module 140 in combination with the filter 150. A safety margin analyzer module 141 can be used which determines first and second safety margins on a comparison between historic predictions and corresponding actual switching time points. For example, the (historic) actual switching time points are available in the historic time series data used by the training module 190. The safety margins are selected to limit the percentage of violating predictions to a percentage below a given threshold value. Thereby, violating predictions are predictions where the actual state switch of the corresponding signal group occurred before the predicted minimum-end-time or after the predicted maximum-end-time in a given time interval before the actual switching time point. For example, the criterion for selecting a safety margin can be defined so that only for a certain percentage of the historical data the actual switching time point falls outside the safety margin. For example, the percentage used as a threshold value may be in the order of 1%.

The following table illustrates results obtained from real-world historic signal state data of one signal group of a traffic light system to estimate the accuracy of the predictions.

| | measure | total | 30 sec |
|---|---|---|---|
| max-end-time | # violations | 1.0% | 0.5% |
| max-end-time | average deviation | 1.5 s | 0.7 s |
| likely-time | average deviation | 0.5 s | 0.2 s |
| min-end-time | # violations | 1.0% | 0.9% |
| min-end-time | average deviation | 1.1 s | 0.6 s |

A violation is counted when the actual switching event in the historic data occurred outside the respective predicted time window. The average deviation is computed as the mean of the absolute deviation between prediction and actual switching time. Thereby, the total value is averaged over the entire time range of the used historic data. The values in column "30 sec" are averaged over the last 30 seconds before the signal state switches. The evaluation was performed with signal state data obtained during one week wherein the data used for training were separated from the data used for validation.

Figure 8:
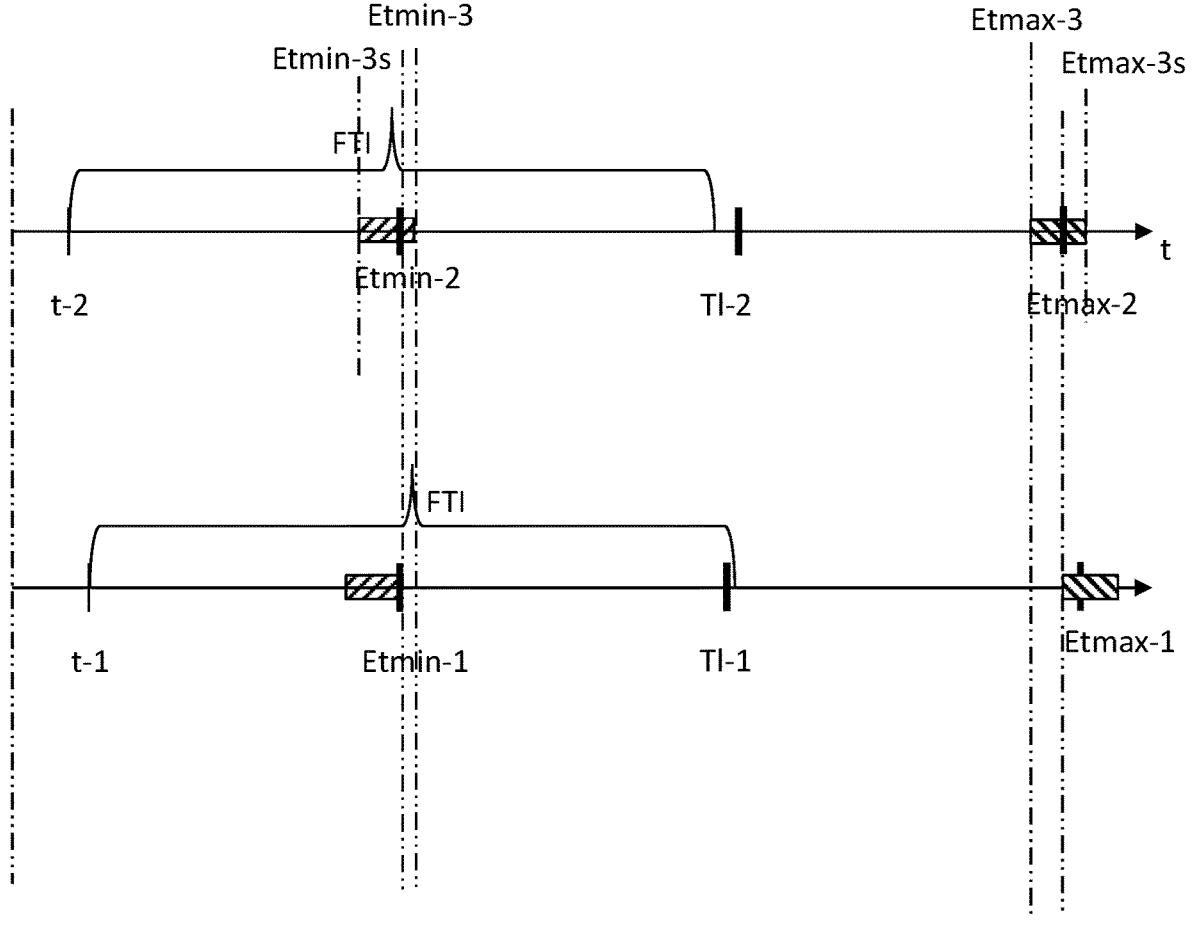
FIG. 8 illustrates the use of safety margins in combination with the filter function.

FIG. 8 illustrates an example with using safety margins SM-min and SM-max when applying the filter 150 at two different time points t–2, t–1. When comparing the filter result with the situation at t–1 and t–2 in FIG. 7, a different filtering outcome is observed. The safety margins have been predetermined as described above. Both safety-margins (for minimum-end-time and maximum-end-time filtering) may be of the same size or may be different. This depends on the historic switching behavior of the traffic light system. In the example, SM-min and SM-max are of the same size.

At t–2, the safety margins are applied 1400 to the latest filtered minimum-/maximum-end-times Etmin-3, Etmax-3 before applying the filter. Through the safety margins the prediction time window which is the basis for the filtering decision is widened with the new filtered minimum-/maximum-end-times adjusted 1420, 1410 by the safety margins) to [Etmin-3*s*, Etmax-3*s*]. At t–2, the filter is in the far-regime and the predicted Etmax-2 is not filtered out anyway. However, predicted Etmin-2 would be earlier than the latest filtered Etmin-3 and would be filtered out without the safety margin (df. FIG. 7). The safety margin SM-min now subtracts 1420 a tolerance interval SM-min from the latest filtered Etmin-3 resulting in the new latest filtered Etmin-3*s* which becomes the time point for comparison. As Etmin-2 is not occurring before Etmin-3*s*, the predicted minimum-end-time Etmin-2 is not filtered out when using the safety margin SM-min.

At t–1, the filter 150 operates in the near-regime and potentially the minimum-end-time and the maximum-end-time could be filtered out in accordance with the filtering rules. In the example, SM-min is subtracted 1420 from Etmin-2 resulting in a new latest filtered minimum-end-time. However, in the example Etmin-1 does not occur earlier than Etmin-2 so that, even without a safety margin, Etmin-1 would not be filtered out. However, predicted Etmax-1 occurs later than the latest filtered maximum-end-time Etmax-2, and would be filtered out by the near regime of the filter. However, the safety margin SM-max is now added 1410 to Etmax-2 resulting in a new latest filtered maximum-end-time which is later than predicted Etmax-1. As a consequence, Etmax-1 is not filtered out when using the safety margin.

FIGS. 3A to 3C illustrate the state of four example signal groups S1 to S4 at a crossing at three different sampling time points ts1, ts2, ts3. The combined switching state is again illustrated as the square in the middle including the respective sub-states of the traffic lights (as in FIG. 1). The crossing is defined by the lines illustrating four rectangular roads where each road has two lanes separated by dashed lines. The stop area for a car in front of a traffic light in the stop-state (e.g., red light) is limited by the dashed lines perpendicular to the respective lane directions.

At sampling time point ts1 (cf. FIG. 3A), the traffic lights S1 and S3 are in stop-state and S2, S4 are in pass-state. The vehicle 401 is approaching S3 from the left to the right. A first combined state is transmitted to the computer system (white triangles in vertical direction indicating the sub-state pass, black triangles in horizontal direction indicating the sub-state stop) at ts1 and succeeding sampling time points which are sampled as long as the first combined state remains.

At sampling time point ts2 (cf. FIG. 3B), the signal groups S2, S4 have switched to stop-state. S1, S3 remain unchanged. A second combined state (four black triangles) is transmitted to the computer system at ts2 and preceding or succeeding sampling time points which occur as long as the second combined state remains.

At sampling time point ts3 (cf. FIG. 3C), the signal groups S2, S4 remain in stop-state whereas S1, S3 have switched to pass-state. A third combined state (white triangles in horizontal direction indicating the sub-state pass, black triangles in vertical direction indicating the sub-state stop) is transmitted to the computer system at ts3 and preceding or succeeding sampling time points which occur as long as the third combined state remains. Vehicle 401 has passed 403 the crossing during the horizontal pass-phase (third combined state).

Figure 9A:
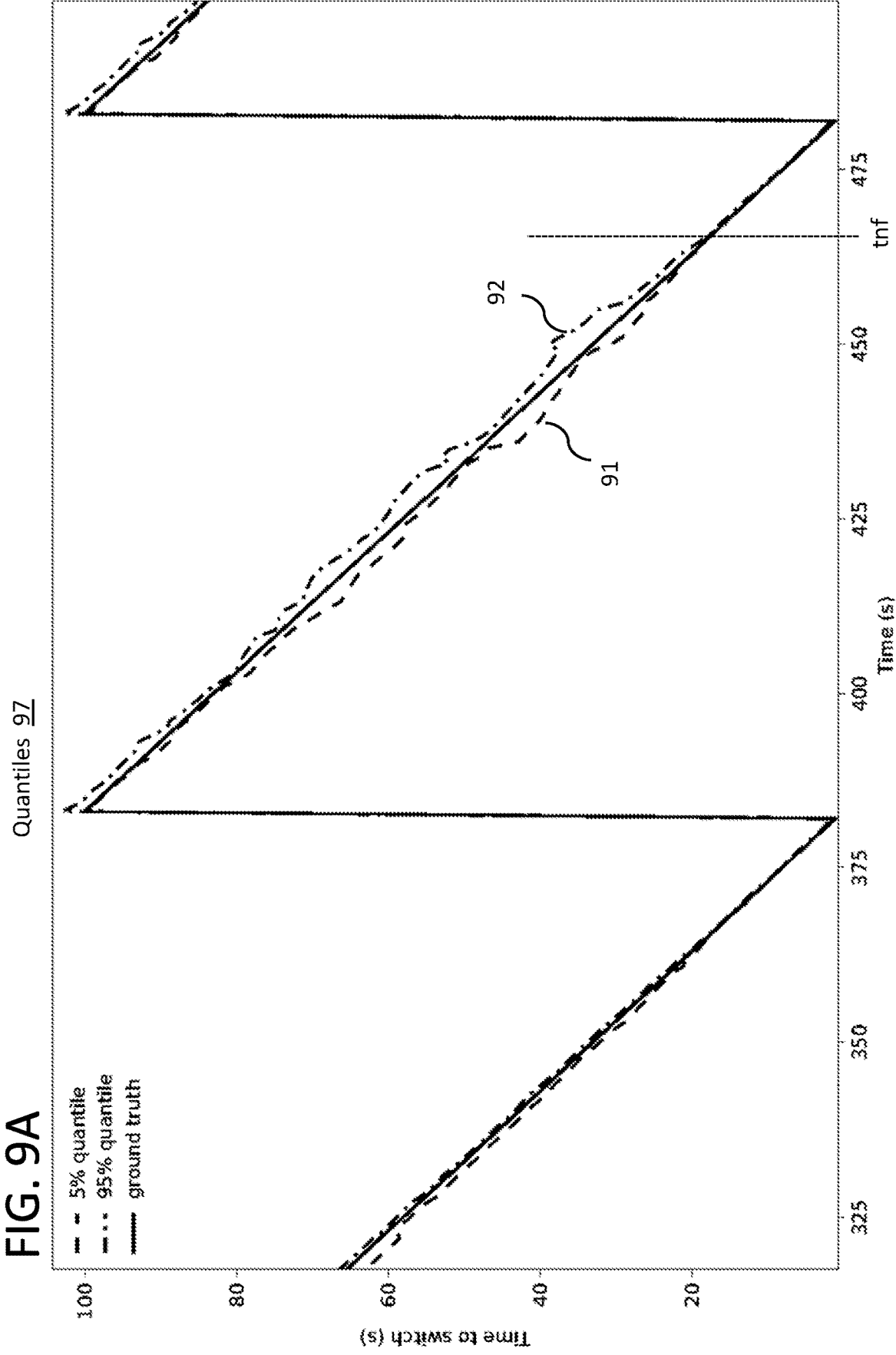
FIG. 9A shows an example of calculated conditional quantiles based on real world data.

FIG. 9A depicts the conditional quantiles calculated by the QRNN. The observed time (ground truth) until the signal switches is drawn as a solid line. The dashed line 91 depicts the 5% quantile and the dashed-dotted line 92 depicts the 95% quantile. These quantiles are subsequently used for minimum-end-time and maximum-end-time prediction, respectively. Ideally, the actual switching time lies in the region between the dashed and the dashed-dotted lines.

FIG. 9 B depicts the filtered conditional quantiles as dashed and dashed dotted lines 93, 94 representing the filtered 5% quantile and filtered 95% quantile, respectively. Like in FIG. 9A the solid line depicts the ground truth. The filtered quantile lines 93, 94 stop undulating earlier (at t=twf) than the corresponding non-filtered lines 91, 92 in FIG. 9A (at t=tnf) when approaching the actual switching time (Time to switch=0) where the "near regime" is active.

Figure 9B:
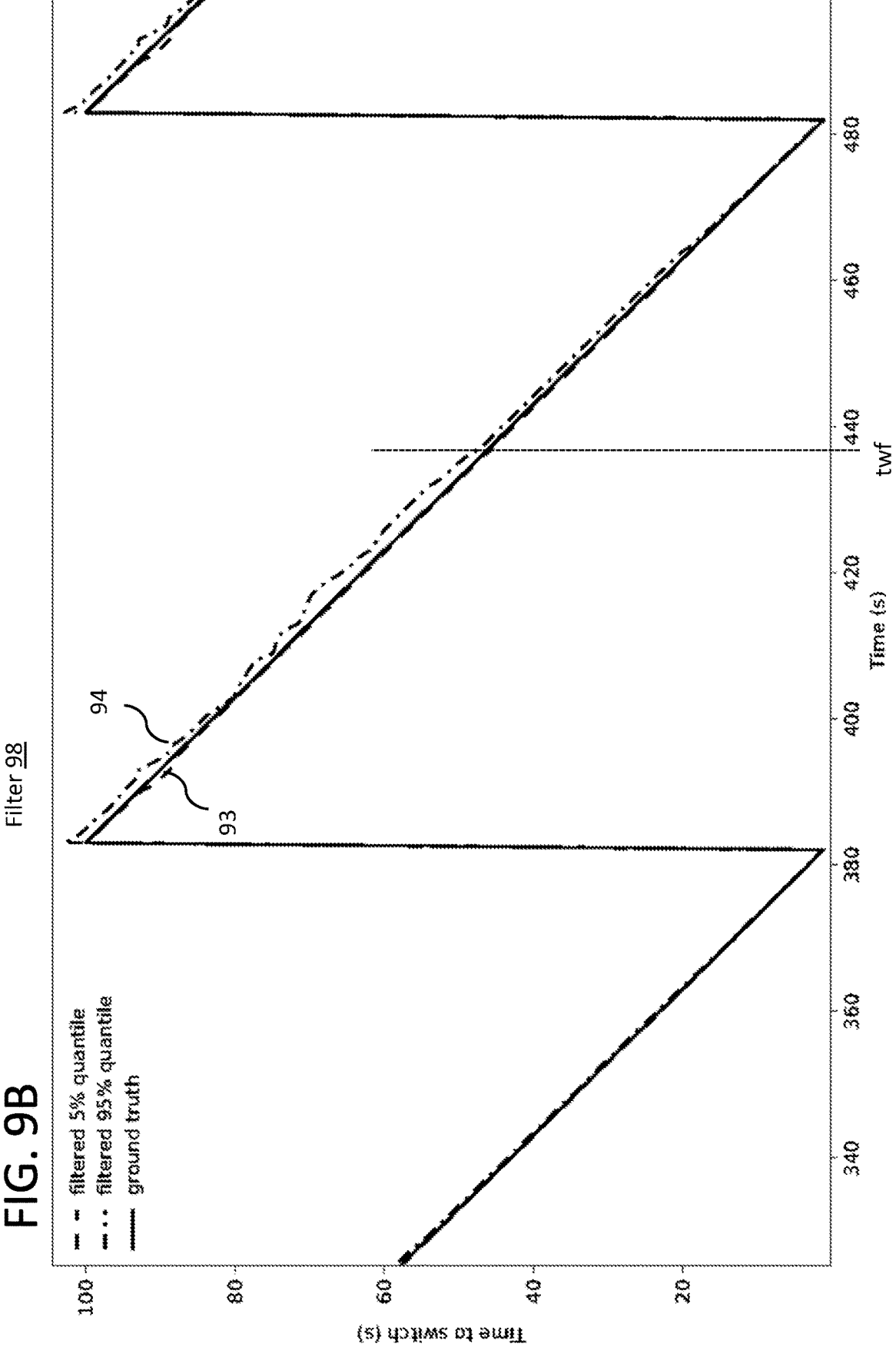
FIG. 9B shows an example of calculated conditional quantiles using the filter function.
Figure 9C:
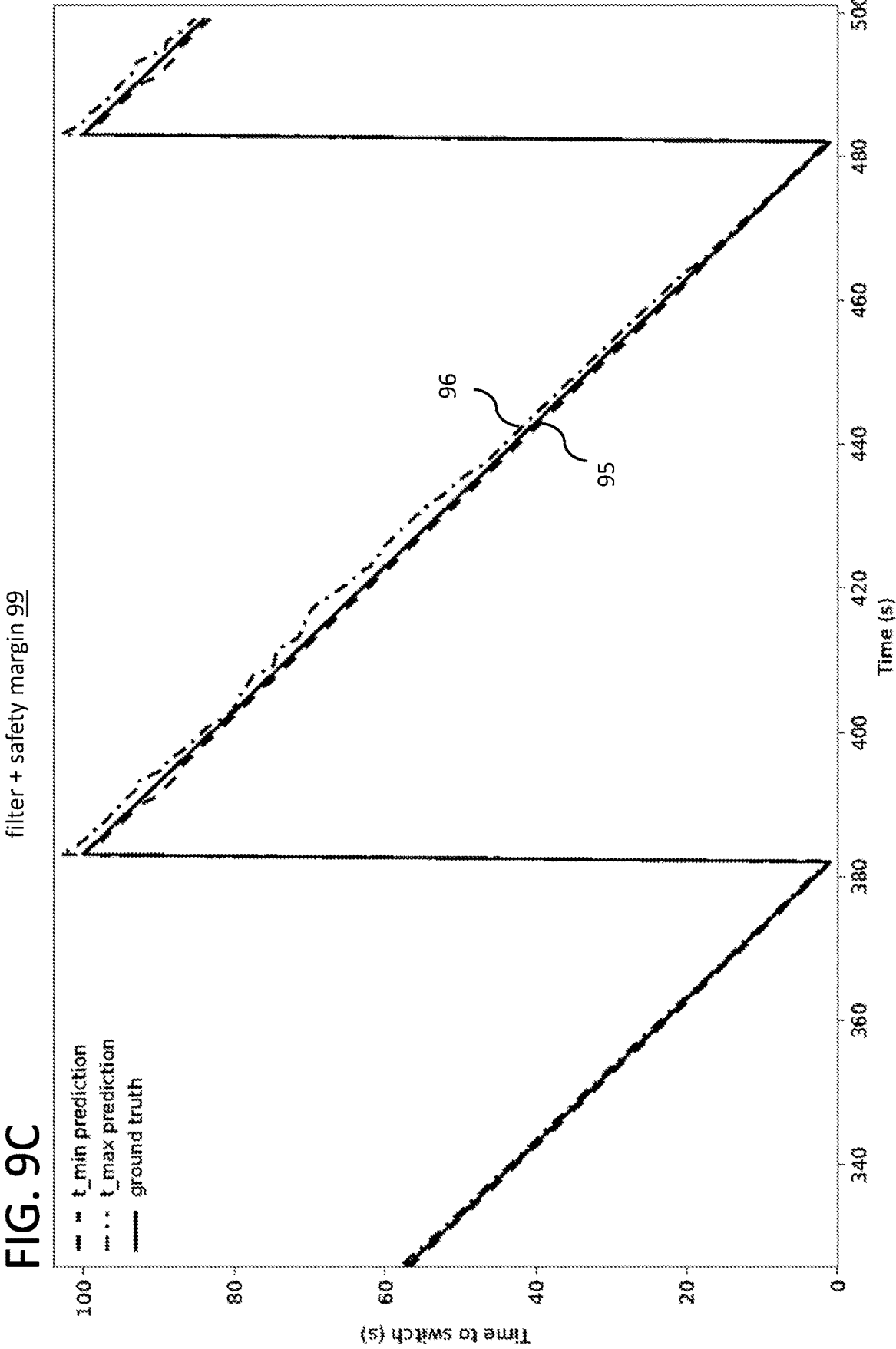
FIG. 9C shows an example of calculated conditional quantiles using safety margins.

In FIG. 9C the filter function is applied together with empirically determined safety margins which are added/subtracted, respectively, to the quantile predictions 93, 94 in FIG. 9B resulting in modified filtered quantile lines 95, 96. In this example, the predictions using the filter function are already very accurate for the corresponding signal group. Therefore, the safety margins are very close to zero and the differences between lines 93, 94 of FIG. 9B and lines 95, 96 of FIG. 9C are so small that they are not visible at the zoom factor used for representing the charts in 97, 98 and 99 of FIGS. 9A to 9C.

Figure 10:
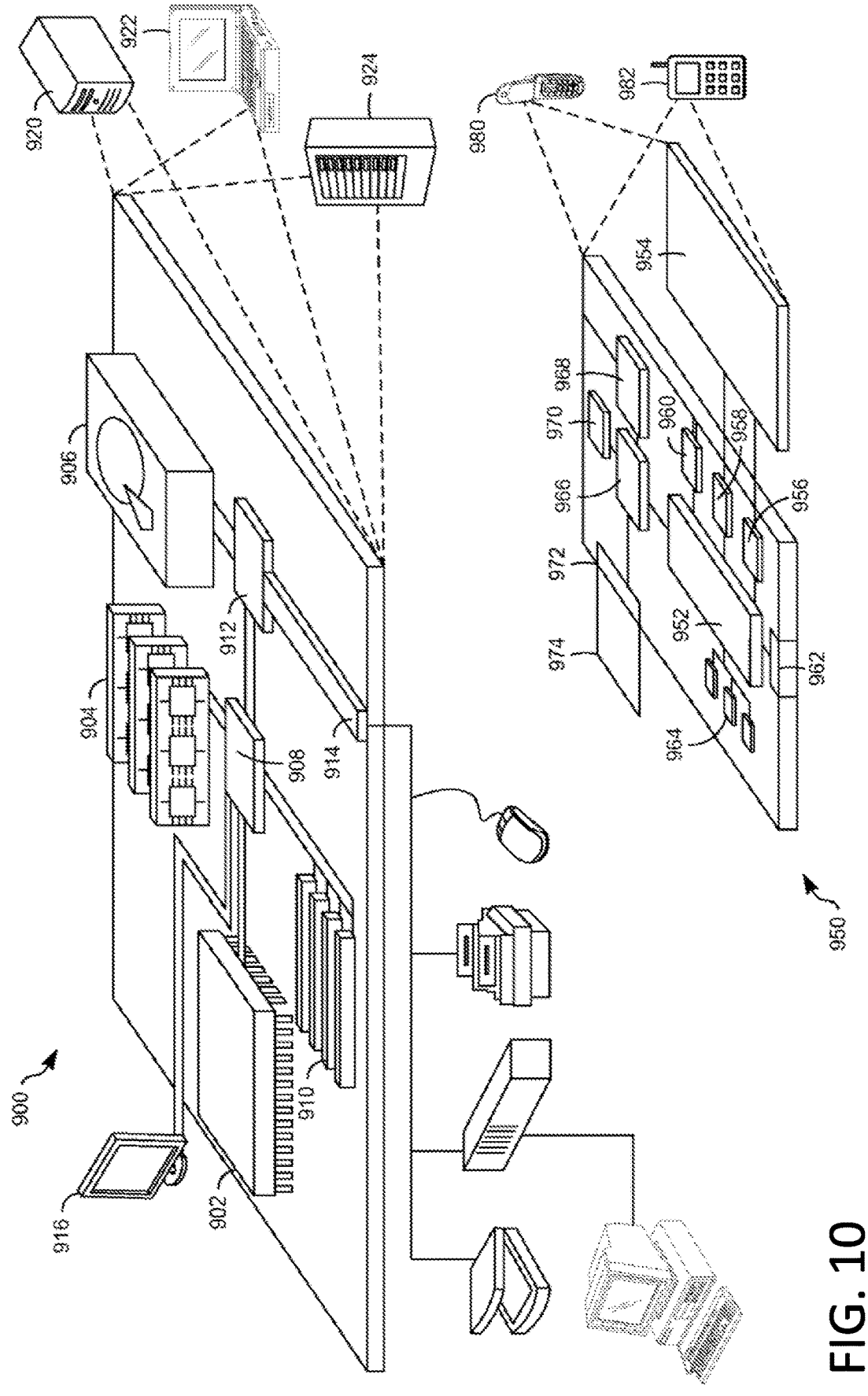
FIG. 10 is a diagram that shows an example of a generic computer device and a generic mobile computer device, which may be used with the techniques described here.

FIG. 10 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, driving assistance systems or board computers of vehicles (e.g., vehicle 401, cf. FIG. 1) and other similar computing devices. For example, computing device 950 may be used as a frontend by a user to interact with the computing device 900. The components shown here, their connections and relationships, and their functions, are meant to be exemplary only, and are not meant to limit implementations of the descriptions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the description.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer implemented method for providing Signal Phase and Timing (SPaT) messages for influencing operation of a vehicle, wherein the SPaT messages include timing parameters for a minimum-end-time, likely-time, and maximum-end-time for a next signal switch of at least one signal group of a traffic light system affecting the vehicle, the method comprising:

receiving signal state data from a controller controlling one or more signal groups (S1 to S4) of a traffic light system, wherein the signal state data of a particular signal group (S*) comprises a current signal state (SD*) of the respective signal group (S*), and information about a time interval (Te*) which has elapsed since a last state switch of the respective signal group (S*);

generating a feature vector (FV) for the one more signal groups (S1 to S4), the feature vector comprising for each of the one or more signal groups at least: a first value indicating the elapsed time (T*p) since a latest switch of the respective signal group (S*) to a pass-state (1), and a second value indicating the elapsed time (T*s) since a latest switch of the respective signal group (S*) to a stop-state (0);

predicting, by at least one quantile regression neural network with a particular current feature vector (T*p, T*s) as test input, for at least one of the one or more signal groups (S1 to S4), as one or more outputs (O1), a low conditional quantile (Ql) representing the minimum-end-time (ETmin), a medium conditional quantile (Qm) representing the likely-time (Tl) and a high conditional quantile (Qh) representing the maximum-end-time (ETmax) for the at least one of the one or more signal groups (S1 to S4), wherein the at least one quantile regression neural network has been trained with stochastic gradient descent, on past feature vectors of at least a subset of the one or more signal groups of the traffic light system and respective low, medium and high conditional quantile outputs, using a loss function being a sum of individual loss functions over the at least one of the one or more signal groups (S1 to S4), and a corresponding one or more conditional quantiles, wherein the individual loss functions are hinge loss functions (HL);

composing a SPaT message including the predicted minimum-end-time (ETmin), likely-time (Tl), and maximum-end-time (ETmax) of the at least one of the one or more signal groups (S1 to S4);

providing the SPaT message to a receiving device associated with the vehicle, and if the time interval between an actual point in time (t−1) and the current predicted likely-time (Tl-1) is below a predefined filter time interval (FTI)

filtering out a current maximum-end-time prediction (Etmax-1) which predicts a later point in time than a previous filtered maximum-end-time prediction (Etmax-2), filtering out a current minimum-end-time prediction (Etmin-1) which predicts an earlier point in time than the previous filtered minimum-end-time prediction (Etmin-3), else, only filtering out the current minimum-end-time prediction (Etmin-2) which predicts an earlier point in time than the previous filtered minimum-end-time prediction (Etmin-3).

2. The method of claim 1, further comprising:

before applying filtering, adding a first predetermined safety margin (SM-max) to a latest filtered maximum-end-time prediction, and subtracting a second predetermined safety margin (SM-min) from the latest filtered maximum-end-time prediction, wherein the first and second predetermined safety margins are determined based on a comparison between historic predictions and corresponding actual switching time points and are selected to limit a percentage of violating predictions to a percentage below a given threshold value, wherein violating predictions are predictions where an actual state switch of the corresponding signal group occurred before the predicted minimum-end-time or after the predicted maximum-end-time in a given time interval before the actual switching time point.

3. The method of claim 1, wherein the at least one quantile regression neural network is implemented using any of the following neural network architectures: a recurrent neural network, a multi-layer perceptron, and a convolutional neural network.

4. The method of claim 1, wherein a grid search or a random search of a parameter space is used to provide a plurality of layers of the at least one quantile regression neural network and a number of hidden units per layer.

5. The method of claim 1, wherein the at least one quantile regression neural network comprises:
a first neural network model trained for predicting state switching from a pass-state to a stop-state; and
a second neural network model trained for predicting state switching from the stop-state to the pass-state.

6. The method of claim 1, wherein the predicted maximum-end-time (ETmax) is only provided with the SPAT message to the receiving device if a future signal switch is predicted to occur within a predefined future interval.

7. The method of claim 6, wherein the predictions by the at least one quantile regression neural network are used to distinguish between first and second conditions based on two value regions of the prediction, with the first condition being that the signal is expected to switch within a predicted time, and the second condition being that no signal switch is expected within the predicted time.

8. A computer program product for providing Signal Phase and Timing (SPaT) messages for influencing operation of a vehicle, wherein the SPAT messages include timing parameters for a minimum-end-time, likely-time, and maximum-end-time for a next signal switch of at least one signal group of a traffic light system affecting the vehicle, and wherein the computer product is tangibly embodied in a non-transitory memory and includes instructions, which, when executed by at least one processor of a computer cause the computer to:
receive signal state data from a controller controlling one or more signal groups (S1 to S4) of a traffic light system, wherein the signal state data of a particular signal group (S*) comprises a current signal state (SD*) of the respective signal group (S*), and information about a time interval (Te*) which has elapsed since a last state switch of the respective signal group (S*);
generate a feature vector (FV) for the one more signal groups (S1 to S4), the feature vector comprising for each of the one or more signal groups at least: a first value indicating the elapsed time (T*p) since a latest switch of the respective signal group (S*) to a pass-state (1), and a second value indicating the elapsed time (T*s) since a latest switch of the respective signal group (S*) to a stop-state (0);
predict, by at least one quantile regression neural network with a particular current feature vector (T*p, T*s) as test input, for at least one of the one or more signal groups (S1 to S4), as one or more outputs (O1), a low conditional quantile (Ql) representing the minimum-end-time (ETmin), a medium conditional quantile (Qm) representing the likely-time (Tl) and a high conditional quantile (Qh) representing the maximum-end-time (ETmax) for the at least one of the one or more signal groups (S1 to S4), wherein the at least one quantile regression neural network has been trained with stochastic gradient descent, on past feature vectors of at least a subset of the one or more signal groups of the traffic light system and respective low, medium and high conditional quantile outputs, using a loss function being a sum of individual loss functions over the at least one of the one or more signal groups (S1 to S4), and a corresponding one or more conditional quantiles, wherein the individual loss functions are hinge loss functions (HL);
composing a SPAT message including the predicted minimum-end-time (ETmin), likely-time (Tl), and maximum-end-time (ETmax) of the at least one of the one or more signal groups (S1 to S4);
provide the SPaT message to a receiving device associated with the vehicle, and
if the time interval between an actual point in time (t−1) and the current predicted likely-time (Tl-1) is below a predefined filter time interval (FTI)
a current maximum-end-time prediction (Etmax-1) which predicts a later point in time than a previous filtered maximum-end-time prediction (Etmax-2) is filtered out,
a current minimum-end-time prediction (Etmin-1) which predicts an earlier point in time than the previous filtered minimum-end-time prediction (Etmin-3) is filtered out,
else,
only filtering out the current minimum-end-time prediction (Etmin-2) which predicts an earlier point in time than the previous filtered minimum-end-time prediction (Etmin-3).

9. The computer program product of claim 8, wherein:
before applying filtering,
a first predetermined safety margin (SM-max) is added to a latest filtered maximum-end-time prediction, and
a second predetermined safety margin (SM-min) is subtracted from the latest filtered maximum-end-time prediction,
wherein the first and second predetermined safety margins are determined based on a comparison between historic predictions and corresponding actual switching time points and are selected to limit a percentage of violating predictions to a percentage below a given threshold value, wherein violating predictions are predictions where an actual state switch of the corresponding signal group occurred before the predicted minimum-end-time or after the predicted maximum-end-time in a given time interval before the actual switching time point.

10. The computer program product of claim 8, wherein the at least one quantile regression neural network is implemented using any of the following neural network architectures: a recurrent neural network, a multi-layer perceptron, and a convolutional neural network.

11. The computer program product of claim 8, wherein a grid search or a random search of a parameter space is used to provide a plurality of layers of the at least one quantile regression neural network and a number of hidden units per layer.

12. The computer program product of claim 8, wherein the at least one quantile regression neural network comprises:
a first neural network model trained for predicting state switching from a pass-state to a stop-state; and
a second neural network model trained for predicting state switching from the stop-state to the pass-state.

13. A computer system for providing Signal Phase and Timing (SPaT) messages for influencing operation of a vehicle, wherein the SPAT messages include timing parameters for a minimum-end-time, likely-time, and maximumend-time for a next signal switch of at least one signal group of a traffic light system affecting the vehicle, the computer system comprising:

an interface component configured to receive signal state data from a controller controlling one or more signal groups (S1 to S4) of a traffic light system, wherein the signal state data of a particular signal group (S*) comprises a current signal state (SD*) of the respective signal group (S*), and information about a time interval (Te*) which has elapsed since last state switch of the respective signal group (S*), and further configured to provide a SPAT message to a receiving device associated with the vehicle;

a data pre-processor configured to generate a feature vector (FV) for the one or more signal groups (S1 to S4) comprising for each of the one or more signal groups at least: a first value indicating the elapsed time (T*p) since a latest switch of the respective signal group (S*) to a pass-state (1), and a second value indicating the elapsed time (T*s) since a latest switch of the respective signal group (S*) to a stop-state (0);

at least one quantile regression neural network configured to receive a particular current feature vector (T*p, T*s) as test input, and to predict for at least one of the one or more signal groups (S1 to S4), as one or more outputs (O1), a low conditional quantile (Ql) representing the minimum-end-time (ETmin), a medium conditional quantile (Qm) representing the likely-time (Tl) and a high conditional quantile (Qh) representing the maximum-end-time (ETmax) for the at least one of the one or more signal groups (S1 to S4), wherein the at least one quantile regression neural network has been trained with stochastic gradient descent, on past feature vectors of at least a subset of the one or more signal groups of the traffic light system and respective low, medium and high conditional quantile outputs, using a loss function being a sum of individual loss functions over the at least one of the one or more signal groups (S1 to S4), and corresponding one or more conditional quantiles, wherein the individual loss functions are hinge loss functions (HL);

a message composer configured to compose the SPAT message including the predicted minimum-end-time (ETmin), likely-time (Tl), and maximum-end-time (ETmax) of the at least one of the one or more signal groups (S1 to S4); and a filter module configured to filter out a current minimum-end-time prediction (Etmin-1 which predicts an earlier point in time than a previous filtered minimum-end-time prediction (Etmin-3), and to filter out a current maximum-end-time prediction (Etmax-1) which predicts a later point in time than the previous filtered maximum-end-time prediction (Etmax-2), if the time interval between an actual point in time (t−1) and the current predicted likely-time (Tl-1) is below a pre-defined filter time interval (FTI); else, only to filter out the current minimum-end-time prediction (Etmin-2) which predicts an earlier point in time than the previous filtered minimum-end-time prediction (Etmin-3).

14. The computer system of claim 13, further comprising a safety margin module configured:

to add a first predetermined safety margin SM-max to a latest filtered maximum-end-time prediction (Etmax-3) before applying the filter module, resulting in a new latest filtered maximum-end-time prediction (Etmax-3s), and to subtract a second predetermined safety margin (SM-min) from a latest filtered low minimum-end-time prediction (Etmin-3) before applying the filter module resulting in a new latest filtered minimum-end-time prediction (Etmax-3s), wherein the first and second predetermined safety margins are determined based on a comparison between historic predictions and corresponding actual switching time points and are selected to limit a percentage of violating predictions to a percentage below a given threshold value, wherein violating predictions are predictions where an actual state switch of the corresponding signal group occurred before the predicted minimum-end-time or after the predicted maximum-end-time in a given time interval before the actual switching time point.

15. The computer system of claim 13, wherein the at least one quantile regression neural network is implemented using any of the following neural network architectures: a recurrent neural network, a multi-layer perceptron, and a convolutional neural network.

16. The computer system of claim 13, wherein a grid search or a random search of the parameter is used to provide a plurality of layers of the at least one quantile regression neural network and a number of hidden units per layer.

17. The system of claim 13, wherein the at least one quantile regression neural network comprises:

a first neural network model trained for predicting state switching from the pass-state to the stop-state; and a second neural network model trained for predicting state switching from the stop-state to the pass-state.

* * * * *